US011050051B2

(12) United States Patent
Peled et al.

(10) Patent No.: US 11,050,051 B2
(45) Date of Patent: Jun. 29, 2021

(54) ELECTRODE COMPOSITIONS AND ALKALI METAL BATTERIES COMPRISING SAME

(71) Applicant: Ramot at Tel-Aviv University Ltd., Tel-Aviv (IL)

(72) Inventors: Emanuel Peled, Even Yehuda (IL); Meital Alon, Tel-Aviv (IL); Diana Golodnitsky, Rishon-LeZion (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 260 days.

(21) Appl. No.: 15/115,935

(22) PCT Filed: Feb. 3, 2015

(86) PCT No.: PCT/IL2015/050119
§ 371 (c)(1),
(2) Date: Aug. 2, 2016

(87) PCT Pub. No.: WO2015/114639
PCT Pub. Date: Aug. 6, 2015

(65) Prior Publication Data
US 2017/0162864 A1  Jun. 8, 2017

Related U.S. Application Data

(63) Continuation of application No. PCT/IL2015/050119, filed on Feb. 3, 2015.

(60) Provisional application No. 61/934,914, filed on Feb. 3, 2014.

(51) Int. Cl.
| | |
|---|---|
| *H01M 4/26* | (2006.01) |
| *H01M 10/04* | (2006.01) |
| *H01M 10/26* | (2006.01) |
| *H01M 10/28* | (2006.01) |
| *H01M 4/04* | (2006.01) |
| *C01B 17/40* | (2006.01) |
| *H01M 4/46* | (2006.01) |
| *H01M 4/136* | (2010.01) |
| *C01B 17/22* | (2006.01) |
| *H01M 4/134* | (2010.01) |
| *H01M 4/36* | (2006.01) |
| *H01M 4/62* | (2006.01) |
| *H01M 4/58* | (2010.01) |
| *H01M 4/40* | (2006.01) |
| *H01M 10/0525* | (2010.01) |
| *H01M 4/525* | (2010.01) |
| *H01M 4/485* | (2010.01) |
| *H01M 4/505* | (2010.01) |
| *H01M 4/02* | (2006.01) |

(52) U.S. Cl.
CPC ............... *H01M 4/26* (2013.01); *C01B 17/22* (2013.01); *C01B 17/40* (2013.01); *H01M 4/0471* (2013.01); *H01M 4/134* (2013.01); *H01M 4/136* (2013.01); *H01M 4/364* (2013.01); *H01M 4/366* (2013.01); *H01M 4/405* (2013.01); *H01M 4/46* (2013.01); *H01M 4/5815* (2013.01); *H01M 4/62* (2013.01); *H01M 4/622* (2013.01); *H01M 4/624* (2013.01); *H01M 10/04* (2013.01); *H01M 10/0525* (2013.01); *H01M 10/26* (2013.01); *H01M 10/28* (2013.01); *H01M 4/485* (2013.01); *H01M 4/505* (2013.01); *H01M 4/525* (2013.01); *H01M 4/5825* (2013.01); *H01M 2004/025* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 6,210,832 B1 | 4/2001 | Visco et al. | |
| 6,908,706 B2 | 6/2005 | Choi et al. | |
| 7,087,348 B2 * | 8/2006 | Holman | H01M 4/13 204/290.01 |
| 8,057,900 B2 | 11/2011 | Luhrs et al. | |
| 2004/0234859 A1 | 11/2004 | Lee et al. | |

(Continued)

FOREIGN PATENT DOCUMENTS

| | | | |
|---|---|---|---|
| CN | 102642024 A | * | 8/2012 |
| JP | 2003-059492 | | 2/2003 |

(Continued)

OTHER PUBLICATIONS

Supplementary European Search Report and the European Search Opinion dated Jun. 14, 2017 From the European Patent Office Re. Application No. 15743315.2. (9 Pages).

(Continued)

*Primary Examiner* — Tanisha Diggs

(57) ABSTRACT

A composition-of-matter comprising a plurality of particles is disclosed herein, the particles comprising a substance reversibly releasing an alkali metal while decreasing in volume and absorbing the alkali metal while increasing in volume. Some or all of the particles are encapsulated within a volume enclosed by a shell or matrix which conducts cations of the alkali metal, wherein a volume of the substance upon maximal absorption of the alkali metal does not exceed the volume enclosed by a shell or matrix. Further disclosed herein is a process for preparing a composition-of-matter by coating particles comprising the aforementioned substance with a conductor of cations of the alkali metal, when the substance is saturated with the alkali metal, as well as electrochemical half cells and batteries including the composition-of-matter.

9 Claims, 13 Drawing Sheets

(56) References Cited

U.S. PATENT DOCUMENTS

| | | | | |
|---|---|---|---|---|
| 2006/0057463 | A1* | 3/2006 | Gao | C01B 33/02 |
| | | | | 429/231.95 |
| 2010/0173198 | A1 | 7/2010 | Zhamiu et al. | |
| 2011/0052998 | A1 | 3/2011 | Liang et al. | |
| 2011/0097629 | A1* | 4/2011 | Yew | H01M 4/366 |
| | | | | 429/231.8 |
| 2012/0202112 | A1 | 8/2012 | Yushin et al. | |
| 2013/0065127 | A1* | 3/2013 | Nazar | H01M 4/5815 |
| | | | | 429/218.1 |
| 2013/0065128 | A1 | 3/2013 | Li et al. | |
| 2013/0164620 | A1 | 6/2013 | Woo et al. | |
| 2013/0295469 | A1 | 11/2013 | Liang et al. | |
| 2013/0344391 | A1 | 12/2013 | Yushin et al. | |
| 2014/0356721 | A1* | 12/2014 | Zhou | H01M 4/366 |
| | | | | 429/231.4 |
| 2017/0170473 | A1 | 6/2017 | Peled et al. | |

FOREIGN PATENT DOCUMENTS

| | | |
|---|---|---|
| WO | WO 2010/059749 | 5/2010 |
| WO | WO 2010/080547 | 7/2010 |
| WO | WO 2010/101936 | 9/2010 |
| WO | WO 2012/054766 | 4/2012 |
| WO | WO 2015/114639 | 8/2015 |
| WO | WO 2015/114640 | 8/2015 |

OTHER PUBLICATIONS

Supplementary European Search Report and the European Search Opinion dated Jun. 30, 2017 From the European Patent Office Re. Application No. 15742677.6. (11 Pages).

Liu et al. "Anomalous High Ionic Conductivity of Nanoporous [Beta]-Li3PS4", Journal of the American Chemical Society, JACS, XP055330622, 135(3): 975-978, Jan. 10, 2013. p. 977.

Liu et al. "Anomalous High Ionic Conductivity of Nanoporous [Beta]-Li3PS4", Journal of the American Chemical Society, JACS, XP055381673, Suppl.: S1-S8, Jan. 23, 2013. Para [Methods].

International Preliminary Report on Patentability dated Aug. 18, 2016 From the International Bureau of WIPO Re. Application No. PCT/IL2015/050120.

International Preliminary Report on Patentability dated Aug. 18, 2016 From the International Bureau of WIPO Re. Application No. PCT/IL2015/050119.

International Search Report and the Written Opinion dated Jul. 1, 2015 From the International Searching Authority Re. Application No. PCT/IL2015/050119.

International Search Report and the Written Opinion dated Jul. 2, 2015 From the International Searching Authority Re. Application No. PCT/IL2015/050120.

Guo et al. "Lithium-Sulfur Battery Cathode Enabled by Lithium-Nitrile Interaction", Journal of the American Chemical Society, JACS, 135: 763-767, Dec. 12, 2012.

Ji et al. "A Highly Ordered Nanostructered Carbon-Sulphur Cathode for Lithium-Sulphur Batteries", Nature Materials, 8: 500-506, Jun. 2009.

Li et al. "High-Performance Hollow Sulfur Nanostructured Battery Cathode Through a Scalable, Room Temperature, One-Step, Bottom-Up Approach", Proceedings of the National Academy of Sciences, 110(18): 7148-7153, Apr. 30, 2013.

Lin et al. "Lithium Superionic Sulfide Cathode for All-Solid Lithium-Sulfur Batteries", ACS Nano, 7(3): 2829-2833, Published Online Feb. 22, 2013.

Liu et al. "A Yolk-Shell Design for Stabilized and Scalable Li-Ion Battery Alloy Anodes", Nano Letters, 12: 3315-3321, May 2, 2012.

Peled "The Electrochemical Behavior of Alkali and Alkaline Earth Metals in Nonaqueous Battery Systems—The Solid Electrolyte Interphase Model", Journal of The Electrochemical Society: Electrochemical Science and Technology, 126(12): 2047-2051, Dec. 1979.

Peled et al. "Lithium-Sulfur Battery: Evaluation of Dioxolane-Based Electrolytes", Journal of The Electrochemical Society, 136(6): 1621-1625, Jun. 1989.

Seh et al. "Sulphur-TiO2 Yolk-Shell Nanoarchitecture With Internal Void Space for Long-Cycle Lithium-Sulphur Batteries", Nature Communications, 4(1331): 1-6, Jan. 8, 2013.

Wu et al. "Soft Template Synthesis of Yolk/Silica Shell Particles", Advanced Materials, 22: 1516-1520, 2010.

Yamin et al. "Lithium Sulfur Battery. Oxidation/Reduction Mechanisms of Polysulfides in THF Solutions", Journal of The Electrochemical Society: Electrochemical Science and Technology, 135(5) 1045-1048, May 1988.

Yang et al. "High-Capacity Micrometer-Sized Li2S Particles as Cathode Materials for Advanced Rechargeable Lithium-Ion Batteries", Journal of the American Chemical Society, 134 (37): 15387-15394, Aug. 21, 2012.

Zhou et al. "Yolk-Shell Structure of Polyaniline-Coated Sulfur for Lithium-Sulfur Batteries", ACS Nano, 135(44): 16736-16743, Oct. 10, 2013.

Official Action dated Oct. 1, 2018 From the U.S. Appl. No. 15/115,947. (15 pages).

Official Action dated Apr. 3, 2019 From the U.S. Appl. No. 15/115,947. (18 pages).

* cited by examiner

ELECTRODE COMPOSITIONS AND ALKALI METAL BATTERIES COMPRISING SAME

RELATED APPLICATIONS

This application is a National Phase of PCT Patent Application No. PCT/IL2015/050119 having International filing date of Feb. 3, 2015, which claims the benefit of priority under 35 USC § 119(e) of U.S. Provisional Patent Application No. 61/934,914 filed on Feb. 3, 2014. The contents of the above applications are all incorporated by reference as if fully set forth herein in their entirety.

FIELD AND BACKGROUND OF THE INVENTION

The present invention, in some embodiments thereof, relates to electrochemistry and more particularly, but not exclusively, to compositions comprising an alkali metal which can be used in an electrode of an alkali metal battery.

In alkali metal ion batteries, the alkali metal cation (usually lithium) undergoes insertion or intercalation into a suitable anode material, such as an alloy or graphite. The alkali metal cation enters the anode structure during charge and exits during discharge. The alkali metal anode is typically protected by a solid electrolyte interphase (SEI) comprising salts of the alkali metal [Peled, *J Electrochem Soc* 1979, 126:2047-2051].

In alkali metal-sulfur batteries, sulfur at the cathode reacts with the alkali metal (usually lithium) to form polysulfides and/or sulfides. Alkali metal-sulfur batteries have many attractive properties. In addition to a high theoretical energy density (about 2600 watt hours/kg for a lithium-sulfur battery), they are made from relatively cheap and nontoxic materials. However they suffer several disadvantages resulting from the solubility of sulfur and of metal polysulfides in battery electrolyte solutions, including self-discharge, low cycle life and low coulombic efficiency.

The typical alkali metal-sulfur organic electrolyte battery comprises an alkali metal anode and a porous carbon cathode loaded with sulfur or polysulfides and bonded by poly(tetrafluoroethylene) or other binder. The organic electrolyte solution is an aprotic organic solution of an alkali salt and is saturated with alkali-metal polysulfide. The electrolyte solvent may be tetrahydrofuran, toluene, dioxolane, glymes, polyethylene oxides, and mixtures thereof.

The redox behavior of sulfur in various aprotic solvents is a multi-electron process with many equilibrium reactions between sulfur and polysulfides [Peled et al., *J Electrochem Soc* 1989, 136:1621-1625; Yamin et al., *J Electrochem Soc* 1988, 135:1045-1048]. The polysulfides in the electrolyte partially dissolve the metal-sulfide-SEI, leading to anode corrosion and to the formation of shorter polysulfides, for example, by a reaction such as: $2Li+Li_2S_8 \rightarrow 2Li_2S_4$. These shorter polysulfides diffuse to the cathode where they re-oxidize or react with the solid sulfur at the cathode to form longer polysulfides, for example, by a reaction such as: $2Li_2S_4+S_8 \rightarrow 2Li_2S_8$. This process is called a shuttle mechanism, and it leads to low energy-conversion efficiency, defined as energy delivered by the battery divided by energy needed to charge it.

In the development of lithium-sulfur batteries, efforts have been made to encapsulate sulfur into carbon structures at the cathode [Ji et al., *Nature Mater* 2009, 8:500-506; Guo et al., *JACS* 2013, 135:763-767]. However, because the molar volume of the alkali metal sulfide and polysulfides is larger than that of sulfur, at the first discharge there is a large volumetric expansion (up to about 80%) which can lead to a partial breakdown of the carbon structure and to the escape of sulfur and polysulfides into the electrolyte solution [Seh et al., *Nature Commun* 2013, 4:1331], resulting in increased self-discharge, low cycle life and low coulombic efficiency.

U.S. Pat. No. 6,908,706 describes a cathode including particles with a sulfur-containing active material core, a conductive shell around the core for promoting electrochemical reactions, and a binder material around the conductive shell.

U.S. Patent Application Publication No. 2011/0052998 describes a cathode for a lithium ion battery in which a porous carbon component comprises mesopores and micropores, and the micropores contain elemental sulfur. The micropores are for containing sulfur and providing efficient contact between sulfur and a conductor, whereas the mesopores are for facilitating transport of lithium ions and accommodating polysulfide and sulfide ions. U.S. Patent Application Publication No. 2013/0164620 alleges that micropores have a limited capability for being infiltrated with sulfur and can become blocked by lithium polysulfides, and describes a cathode in which a sulfur-infiltrated mesoporous conductive material is mixed with a mesoporous conductive material without sulfur.

U.S. Patent Application Publication No. 2013/0065128 describes cathodes comprising a sulfur-based material encapsulated by a polymer shell, by a porous $TiO_2$ shell or within a hollow carbon nanofiber. The sulfur-based material occupies less than 100% of a hollow structure (which is at least 20 nm wide), such that the hollow structure comprises a void. Voids were generated by forming a hollow sulfur nanoparticle within a polymer shell, by using toluene to dissolve sulfur coated by porous $TiO_2$, and by controlling the amount of sulfur loaded into carbon nanotubes.

Graphite has been widely used as anode material in lithium ion batteries. In the fully charged state, its potential is very close to that of metallic lithium. This leads to possible problems with high-rate charging, such as in regenerative braking of hybrid electric vehicles (HEVs), especially at low ambient temperatures. In such circumstances, the lithium may form dendrite (needle-like) deposits on the surface of the graphite anode, which may penetrate the separator, short the battery, melt and cause a thermal runaway situation. In addition, a graphite intercalation anode has low gravimetric and volumetric energy densities, about 370 ampere hours per kg and 770 ampere hours per liter, compared to 3,800 ampere hours per kg for pure lithium.

Aluminum, tin and silicon each form lithium-rich alloys with high melting points and energy densities, e.g., $Li_{44}Sn$ (992 ampere hours per kg) and $Li_{44}Si$ (3,600 ampere hours per kg). However, the very large volume changes during the lithium intercalation—de-intercalation processes (over 300% for a silicon anode) lead to fast anode disintegration which severely limits extended deep cycling, thereby restraining practical application of such anodes. Attempts to reduce the volume change and disintegration by coating the silicon particles with a thin carbon film have not solved this problem, as the silicon particles expand upon lithiation (battery charge) and break the carbon shell.

U.S. Patent Application Publication No. 2013/0344391 describes battery electrode compositions comprising core-shell composites with a shell substantially permeable to metal ions, an active material such as silicon for storing and releasing metal ions, and a collapsible core (e.g., porous carbon material) and/or an internal void for accommodating changes in volume of the active material.

Liu et al. [*Nano Lett* 2012, 12:3315-3321] describes silicon nanoparticles inside of thin, self supporting carbon shells with a rationally designed void space between the particles and the shell, for use in a silicon electrode for lithium ion batteries. Voids were generated by using HF etching to remove $SiO_2$ from partially oxidized silicon inside the carbon shell.

Wu & Xu [*Adv Mater* 2010: 22:1516-1520] describe a method of producing hollow silica spheres incorporated with different particles independent of their diameters, geometry and composition. Lithium ion batteries are described as a potential application for such particles.

SUMMARY OF THE INVENTION

According to an aspect of some embodiments of the invention, there is provided a process for preparing a composition-of-matter comprising a plurality of particles, the particles comprising a substance reversibly releasing an alkali metal while decreasing in volume and absorbing the alkali metal while increasing in volume, wherein in at least a portion of the particles, each particle is being encapsulated within a volume enclosed by a shell or matrix which conducts cations of the alkali metal, the process comprising:

i) providing particles comprising the substance reversibly releasing an alkali metal while decreasing in volume and absorbing the alkali metal while increasing in volume, wherein the substance is saturated with the alkali metal; and ii) coating the particles with a conductor of cations of the alkali metal, thereby forming the shell or matrix.

According to an aspect of some embodiments of the invention, there is provided a process for preparing a composition-of-matter comprising a plurality of particles, the particles comprising a substance selected from the group consisting of sulfur, lithium sulfide and a lithium polysulfide, wherein in at least a portion of the particles, each particle is being encapsulated within a volume enclosed by a shell or matrix which conducts lithium cations, the process comprising:

i) providing particles comprising lithium sulfide; and ii) coating the particles with a conductor of lithium cations, thereby forming the shell or matrix.

According to an aspect of some embodiments of the invention, there is provided a composition-of-matter prepared according to a process described herein.

According to an aspect of some embodiments of the invention, there is provided a composition-of-matter comprising a plurality of particles, the particles comprising a substance reversibly releasing an alkali metal while decreasing in volume and absorbing the alkali metal while increasing in volume, wherein in at least a portion of the particles, each particle is being encapsulated within a volume enclosed by a shell or matrix which conducts cations of the alkali metal, and wherein a volume of the substance upon maximal absorption of the alkali metal does not exceed the volume enclosed by a shell or matrix.

According to an aspect of some embodiments of the invention, there is provided a composition-of-matter comprising a plurality of particles, the particles comprising a substance selected from the group consisting of sulfur, lithium sulfide and a lithium polysulfide, wherein in at least a portion of the particles, each particle is being encapsulated within a volume enclosed by a shell or matrix which conducts lithium cations, wherein an amount of sulfur atoms in each particle is such that a volume of lithium sulfide formed from the sulfur atoms and lithium does not exceed the volume enclosed by a shell or matrix.

According to an aspect of some embodiments of the invention, there is provided an electrochemical half cell comprising an electrode which comprises a composition-of-matter described herein, and a liquid comprising an electrolyte.

According to some of any of the embodiments of the invention relating to an electrochemical half cell, the shell or matrix which conducts cations of the alkali metal is insoluble in the liquid comprising an electrolyte.

According to some of any of the embodiments of the invention relating to an electrochemical half cell, the composition-of-matter is in a form of a powder, and the powder is attached by a binder to a current collector.

According to some of any of the embodiments of the invention relating to an electrochemical half cell, the powder is attached by a binder to a current collector in combination with carbon powder.

According to an aspect of some embodiments of the invention, there is provided a rechargeable alkali metal ion battery comprising at least one electrochemical half cell described herein.

According to an aspect of some embodiments of the invention, there is provided a rechargeable alkali metal ion battery comprising at least one electrochemical half cell described herein and an alkali metal ion anode.

According to some of any of the embodiments of the invention, the anode comprises a porous alkali metal-absorbing material selected from the group consisting of carbon, silicon, tin, aluminum and alloys thereof.

According to some of any of the embodiments of the invention, the anode comprises a composition-of-matter described herein.

According to an aspect of some embodiments of the invention, there is provided a rechargeable alkali metal ion battery comprising at least one electrochemical half cell described herein and an alkali metal ion cathode.

According to some of any of the embodiments of the invention, the alkali metal is lithium and the cathode comprises a lithium-containing substance selected from the group consisting of lithium iron phosphate, lithium cobalt oxide, lithium nickel oxide, lithium manganese oxide, lithium nickel manganese cobalt oxide, lithium nickel cobalt aluminum oxide and lithium titanate.

According to some of any of the embodiments of the invention relating to a battery, when a cathode of the battery is in a fully discharged state, an amount of the alkali metal in an anode of the battery is no more than 50% of a capacity of the anode.

According to some of any of the embodiments of the invention, a ratio of the volume of the substance upon maximal absorption of the alkali metal to the volume enclosed by a shell or matrix is uniform among at least 90% of the particles.

According to some of any of the embodiments of the invention, a volume of the substance upon maximal absorption of the alkali metal is at least 80% of the volume enclosed by a shell or matrix.

According to some of any of the embodiments of the invention, the shell or matrix is selected so as to be insoluble in a liquid comprising an electrolyte.

According to some embodiments of the invention, the shell or matrix is substantially free of pores of at least 2 nm in diameter.

According to some of any of the embodiments of the invention, the shell or matrix which conducts cations of the alkali metal comprises an ion conductor comprising the alkali metal, the ion conductor being selected from the group consisting of a salt, a glass, a polymer electrolyte, a ceramic and any combination thereof.

According to some of any of the embodiments of the invention, the ion conductor is selected from the group consisting of a carbonate salt of the alkali metal, a sulfate salt of the alkali metal, a fluoride salt of the alkali metal, a metal disulfide comprising the alkali metal, a metal oxide comprising the alkali metal, and a metal phosphate comprising the alkali metal and any combination thereof.

According to some of any of the embodiments of the invention, the ion conductor is doped with at least one divalent cation and/or trivalent cation.

According to some of any of the embodiments of the invention, the ion conductor has a melting point lower than a melting point of the substance upon maximal absorption of the alkali metal.

According to some of any of the embodiments of the invention, the shell or matrix comprises at least one electron conductor.

According to some of any of the embodiments of the invention, the electron conductor is selected from the group consisting of carbon nanoparticles, metal nanoparticles, a metal sulfide and a metal disulfide.

According to some of any of the embodiments of the invention, the alkali metal is lithium.

According to some embodiments of the invention, the substance is selected from the group consisting of sulfur, a sulfide of the alkali metal and a polysulfide of the alkali metal.

According to some of any of the embodiments of the invention, the shell or matrix comprises at least one lithium salt selected from the group consisting of lithium sulfate, lithium fluoride and lithium carbonate.

According to some of any of the embodiments of the invention, the at least one lithium salt is doped with calcium.

According to some of any of the embodiments of the invention, the shell or matrix comprises at least one additional compound selected from the group consisting of calcium fluoride and alumina, and the particles and/or the shell or matrix comprises at least one additional compound selected from the group consisting of graphite and nickel.

According to some of any of the embodiments of the invention, the substance upon maximal absorption of the alkali metal is a sulfide of the alkali metal.

According to some of any of the embodiments of the invention, the substance upon maximal absorption of the alkali metal is a disulfide of the alkali metal.

According to some of any of the embodiments of the invention, the substance is selected from the group consisting of:

a) a compound which forms an alloy with the alkali metal; and b) an alloy of the alkali metal with the compound.

According to some of any of the embodiments of the invention, the compound which forms an alloy with an alkali metal is selected from the group consisting of silicon, tin, antimony, germanium, lead, bismuth, magnesium, aluminum and mixtures thereof.

According to some of any of the embodiments of the invention, the substance upon maximal absorption of the alkali metal has a general formula selected from the group consisting of $Li_xSi$, wherein x is in a range of from 2.5 to 4.4; $Li_xSn$, wherein x is in a range of from 2.5 to 4.4; and $Li_xSb$, wherein x is in a range of from 1 to 3.

According to some embodiments of the invention, an average size of the particles comprising the substance reversibly releasing an alkali metal is in a range of from 1 to 1000 nm.

According to some of any of the embodiments of the invention, the average size of the particles comprising the substance reversibly releasing an alkali metal is in a range of from 30 to 300 nm.

According to some of any of the embodiments of the invention, the shell or matrix is formed from particles characterized by an average size in a range of from 0.5 to 100 nm.

According to some embodiments of the invention, the shell or matrix is formed from particles characterized by an average size in a range of from 1 to 20 nm.

According to some of any of the embodiments of the invention, the composition-of-matter described herein is in a form of a powder.

According to some of any of the embodiments of the invention relating to a process described herein, the coating described herein comprises:

mixing the particles comprising the substance reversibly releasing an alkali metal with particles of the conductor of cations of the alkali metal, and optionally with additional particles of an electron conductor, to obtain a mixture; and subjecting the mixture to a heat treatment, to thereby form the shell or matrix.

According to some of any of the embodiments of the invention, the heat treatment effects sintering of particles in the mixture.

According to some of any of the embodiments of the invention, the sintering is effected by heating for at least 1 hour at a temperature of no more than 10° C. lower than a melting point of the conductor of cations of the alkali metal.

According to some of any of the embodiments of the invention, the heat treatment effects melting of the particles of the conductor of cations of the alkali metal and/or the additional particles of an electron conductor, but not melting of the particles comprising the substance reversibly releasing an alkali metal.

According to some of any of the embodiments of the invention, the heat treatment comprises heating to a temperature above a melting point of at least one ion conductor and/or electron conductor in the conductor of cations of the alkali metal, and below a melting point of the substance reversibly releasing an alkali metal.

According to some of any of the embodiments of the invention relating to a process described herein, the shell or matrix is formed from particles characterized by a width in a range of from 0.5 to 100 nm.

According to some of any of the embodiments of the invention, the process further comprises grinding the composition-of-matter to form a powder.

According to some of any of the embodiments of the invention, the process further comprises forming any of the particles described herein by ball-milling.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

The patent or application file contains at least one drawing executed in color. Copies of this patent or patent application publication with color drawings will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic illustration of a charge-discharge process according to some embodiments of the invention.

FIG. 2 is a schematic illustration of a particle comprising an alkali metal sulfide doped with electron conductor, ion conductor (preferably cation conductor), electron-ion conductor and catalyst particles, which is encapsulated by a matrix material formed from electron conductor, ion conductor and/or electron-ion conductor particles, according to some embodiments of the invention.

FIG. 3 is a schematic illustration of a particle comprising an alkali metal sulfide doped with electron conductor particles, which is encapsulated by a matrix material formed from electron conductor, ion conductor and electron-ion conductor particles, according to some embodiments of the invention.

FIG. 4 is a schematic illustration of a particle comprising an alkali metal sulfide doped with electron conductor, ion conductor, electron-ion conductor and catalyst particles, which is encapsulated by a matrix material formed from electron conductor and ion conductor particles, according to some embodiments of the invention.

FIG. 5 is a schematic illustration of a particle comprising an alkali metal sulfide doped with electron conductor, ion conductor and catalyst particles, which is encapsulated by a matrix material formed from electron conductor and ion conductor particles, according to some embodiments of the invention.

FIG. 6 is a schematic illustration of a particle comprising an alkali metal sulfide doped with electron conductor particles, which is encapsulated by a matrix material formed from electron conductor and ion conductor particles, according to some embodiments of the invention.

FIG. 7 is a schematic illustration of a particle comprising an alkali metal sulfide doped with electron conductor and electron-ion conductor particles, which is encapsulated by a matrix material formed from electron-ion conductor particles, according to some embodiments of the invention.

FIG. 8 is a schematic illustration of a particle comprising an alkali metal sulfide doped with electron-ion conductor particles, which is encapsulated by a matrix material formed from electron-ion conductor particles, according to some embodiments of the invention.

FIG. 9 is a schematic illustration of a cluster of particles comprising an alkali metal sulfide (such as depicted in any one of FIGS. 2-8) encapsulated in a common matrix formed from electron conductor, ion conductor (preferably cation conductor) and/or electron-ion conductor particles, according to some embodiments of the invention.

Figure 1:
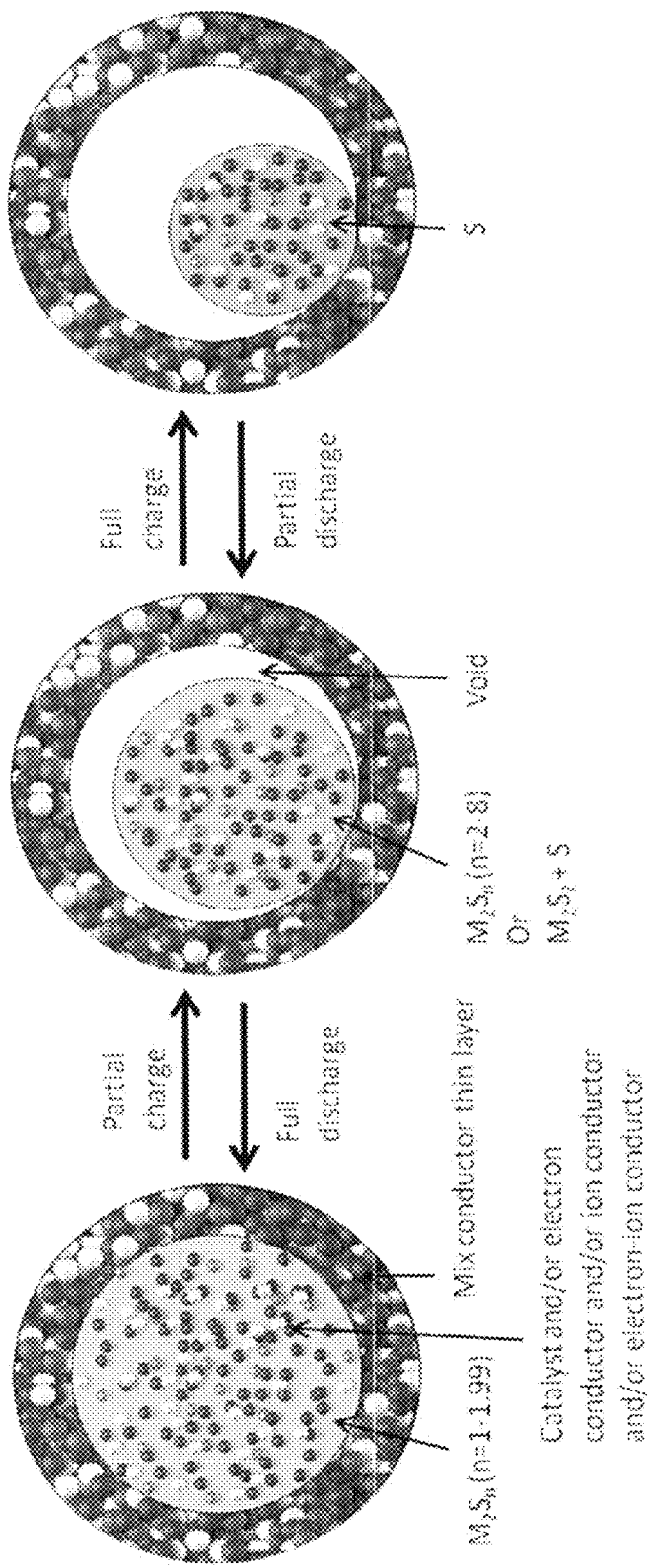
Figure 2:
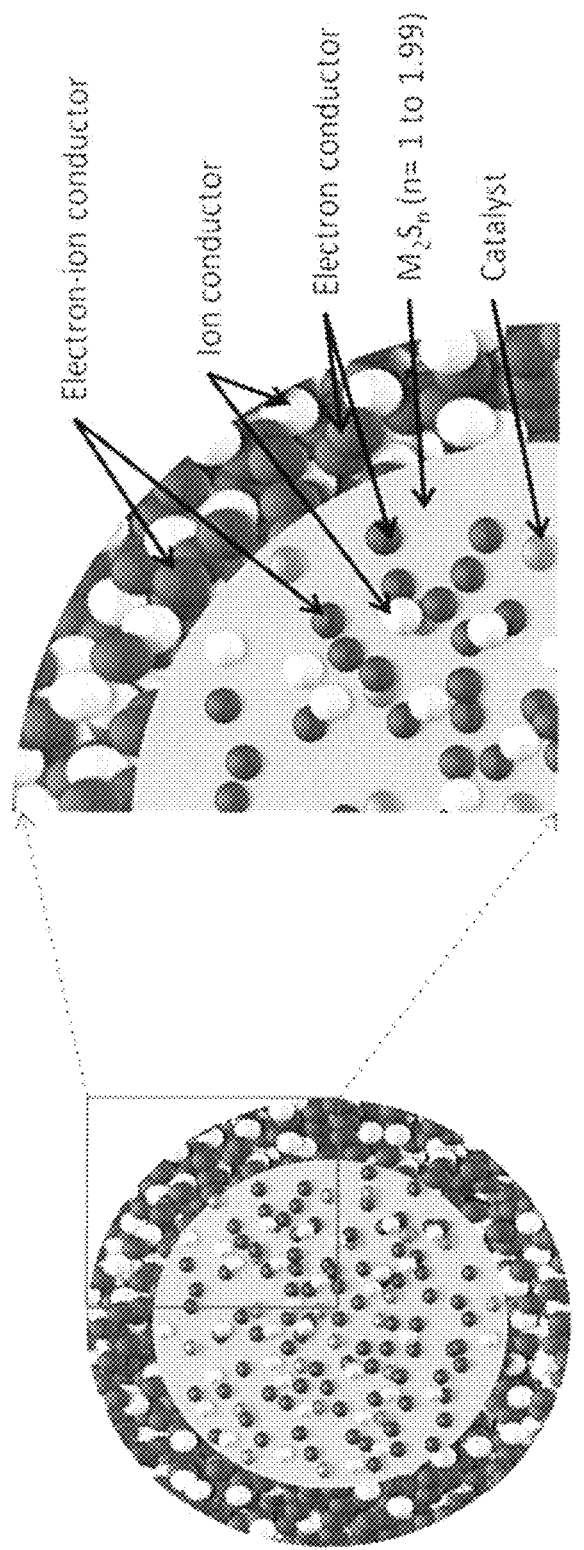
Figure 3:
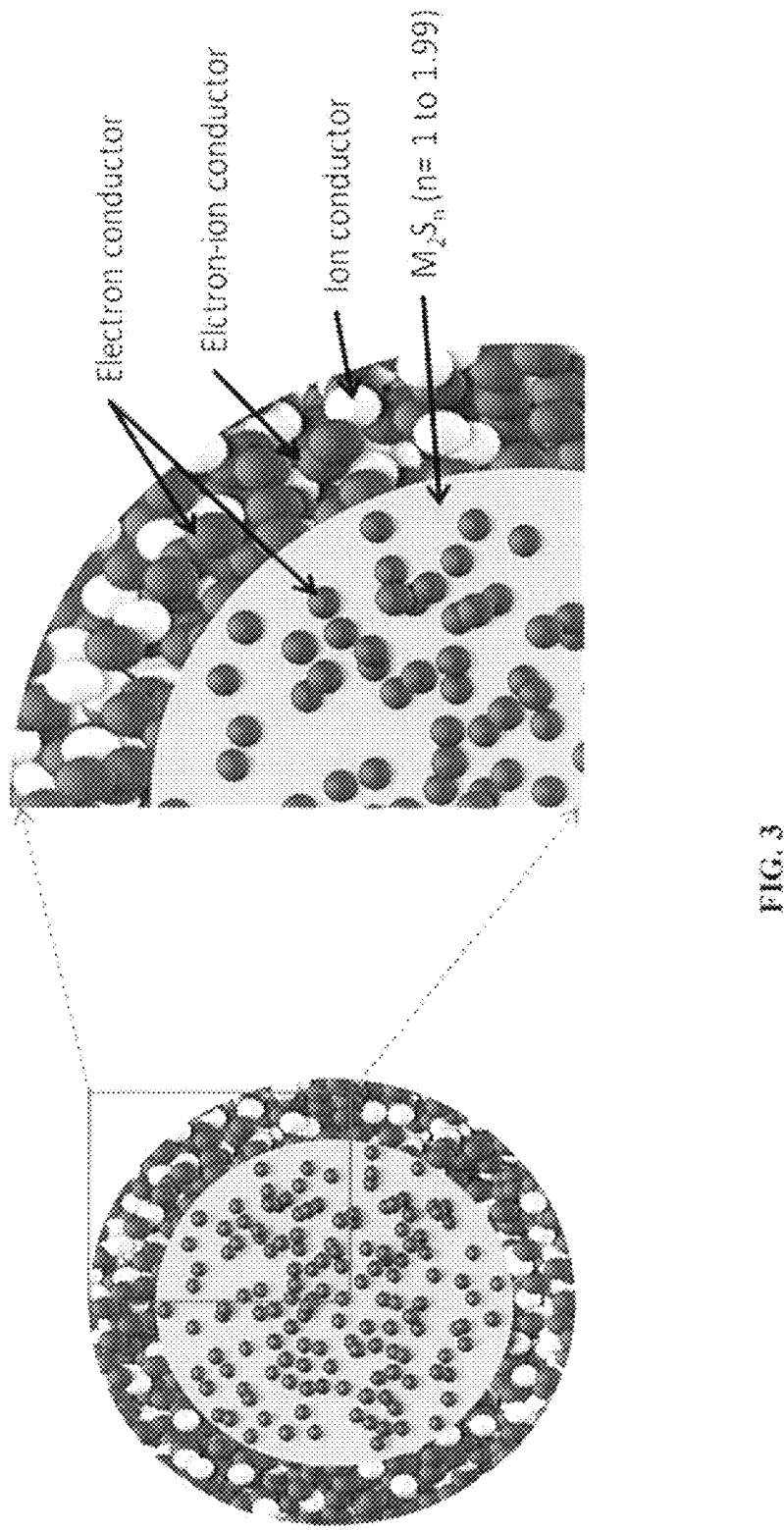
Figure 4:
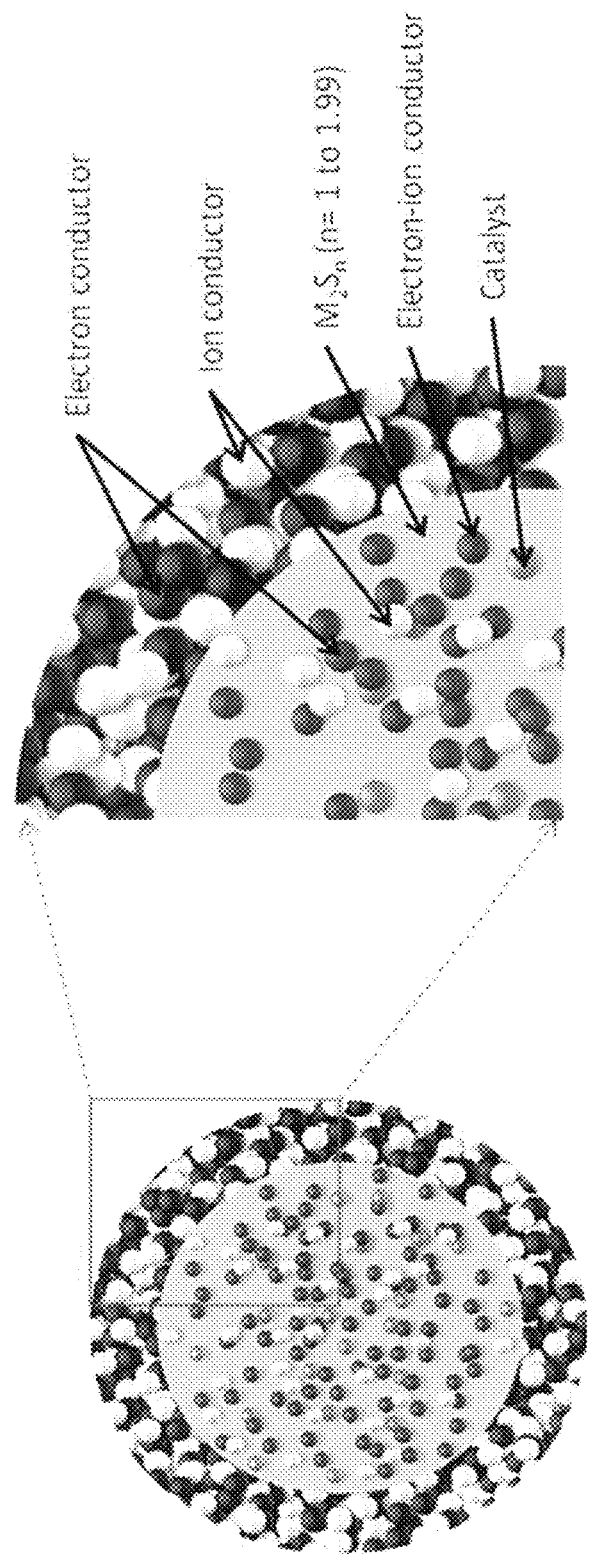
Figure 5:
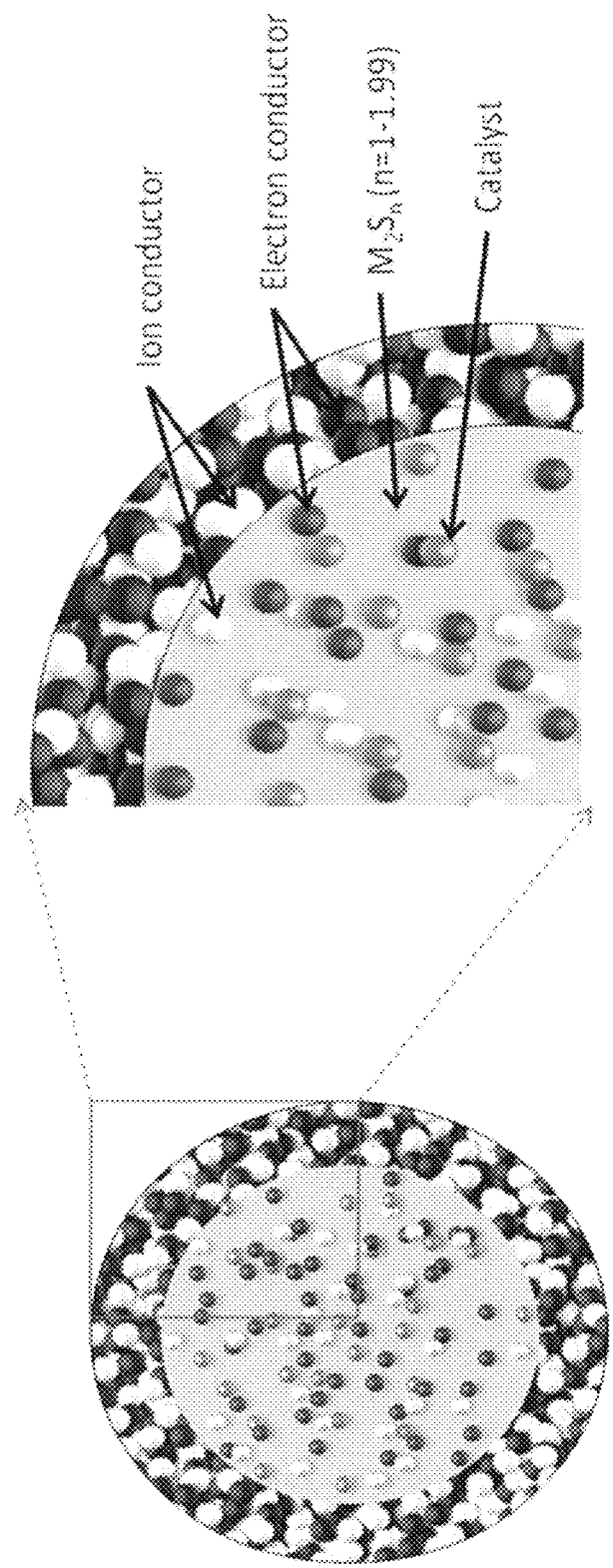
Figure 6:
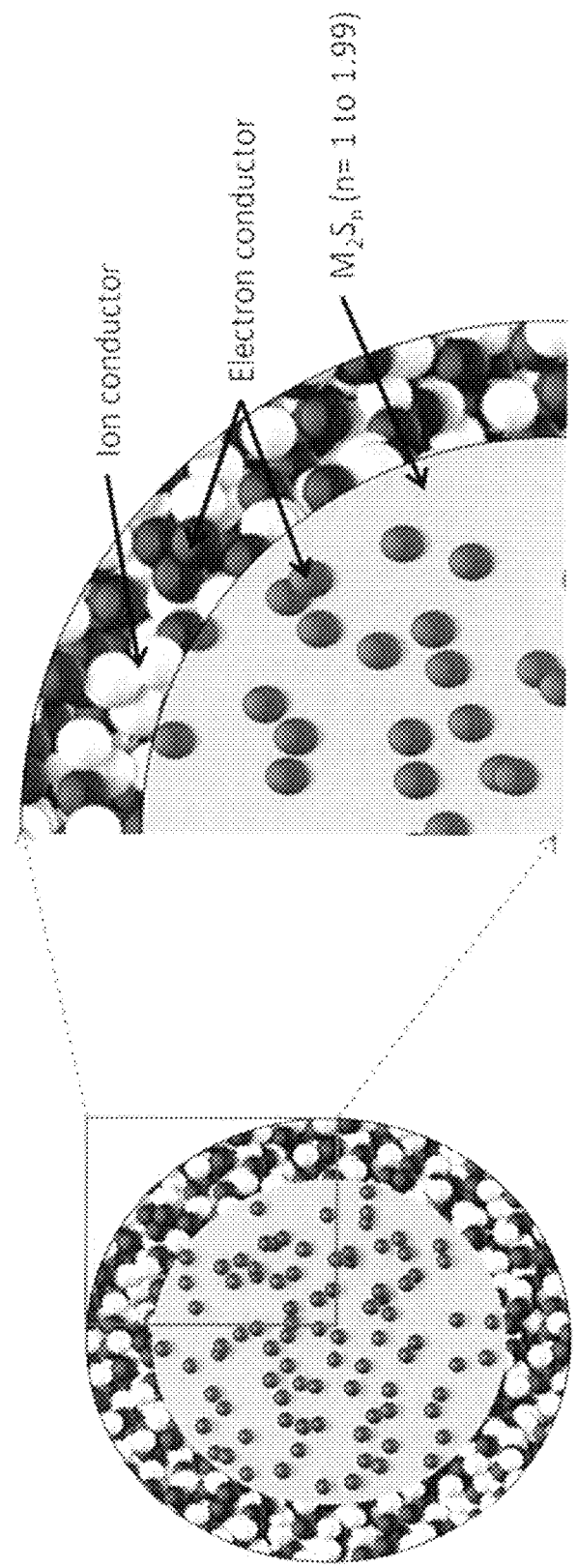
Figure 7:
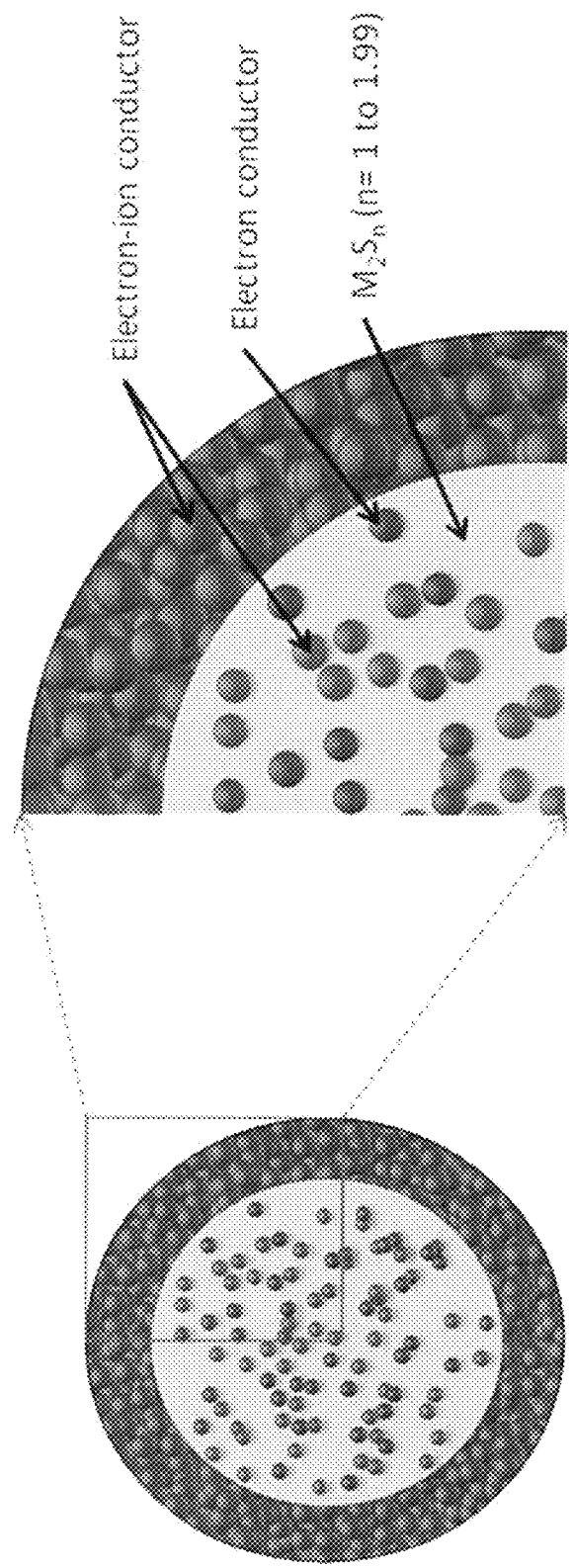
Figure 8:
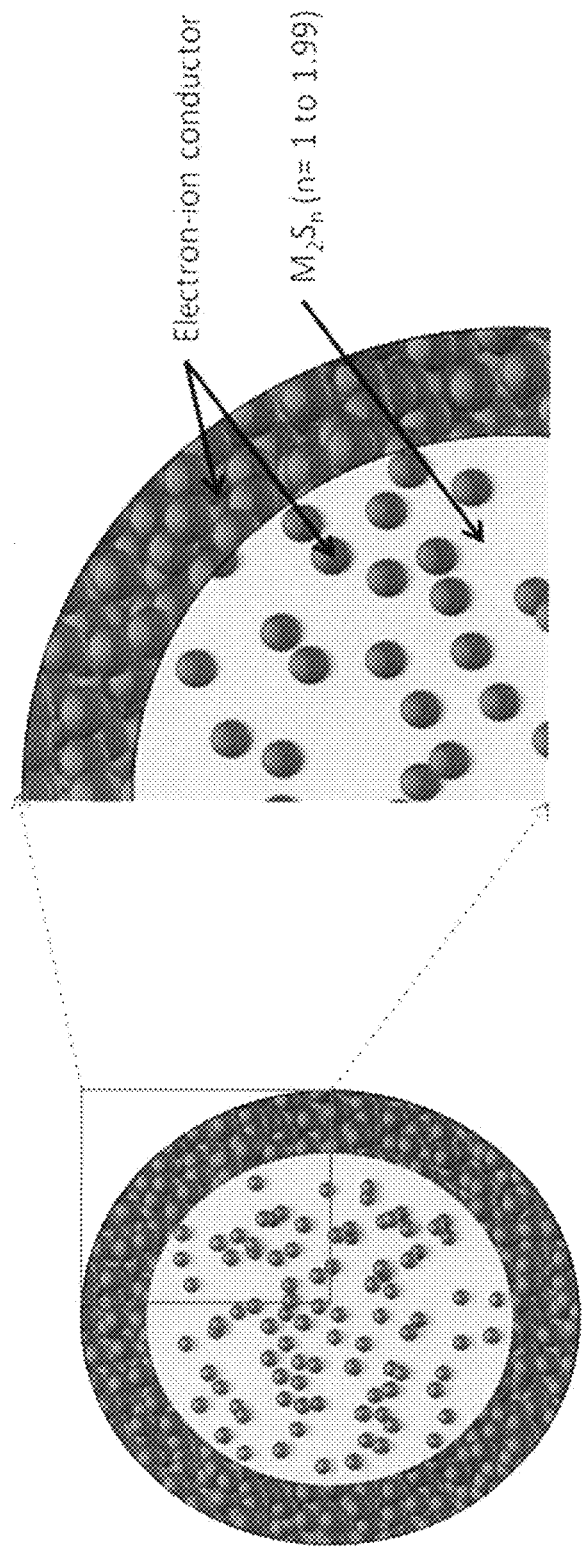
Figure 9:
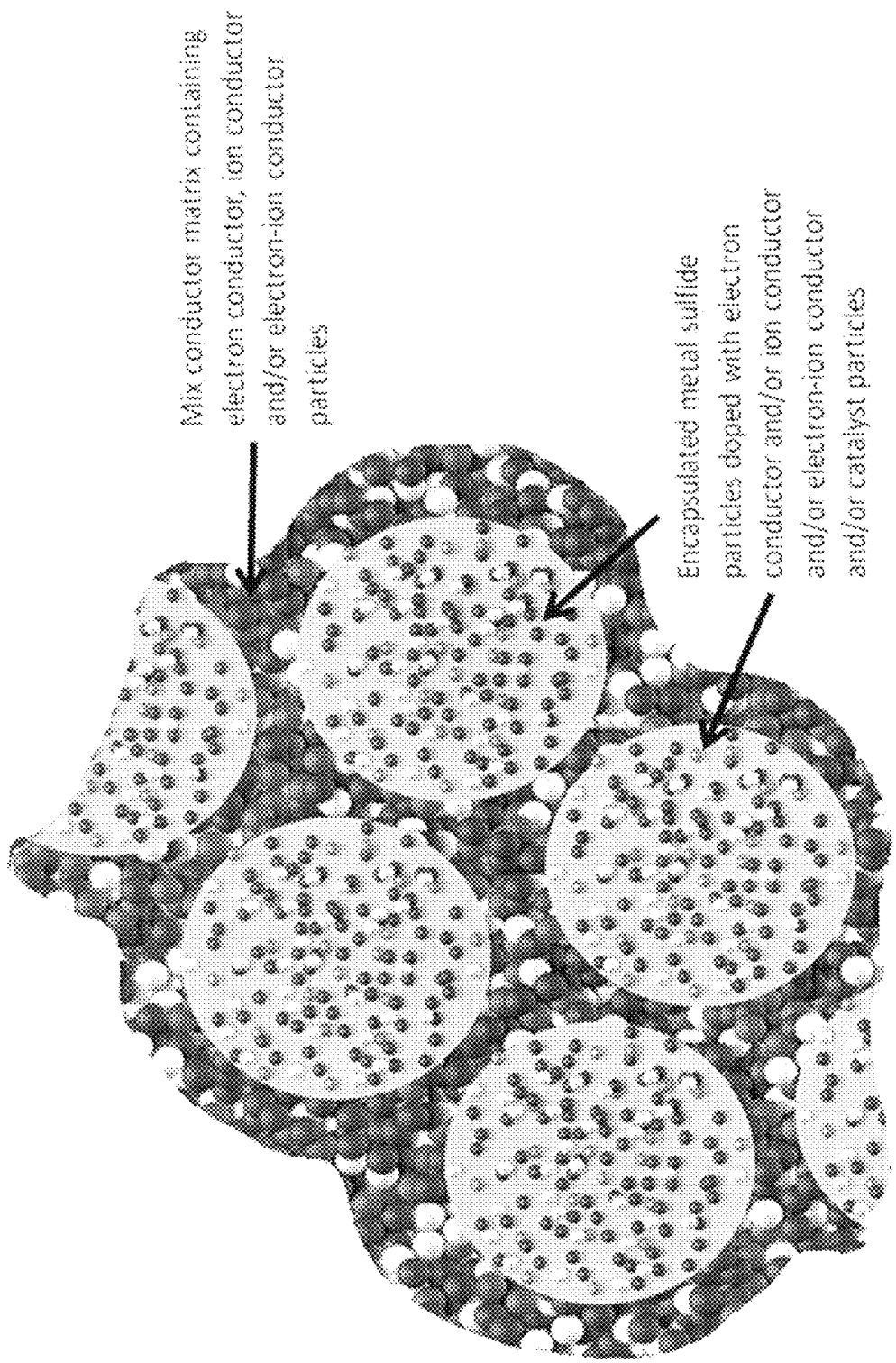
Figure 10:
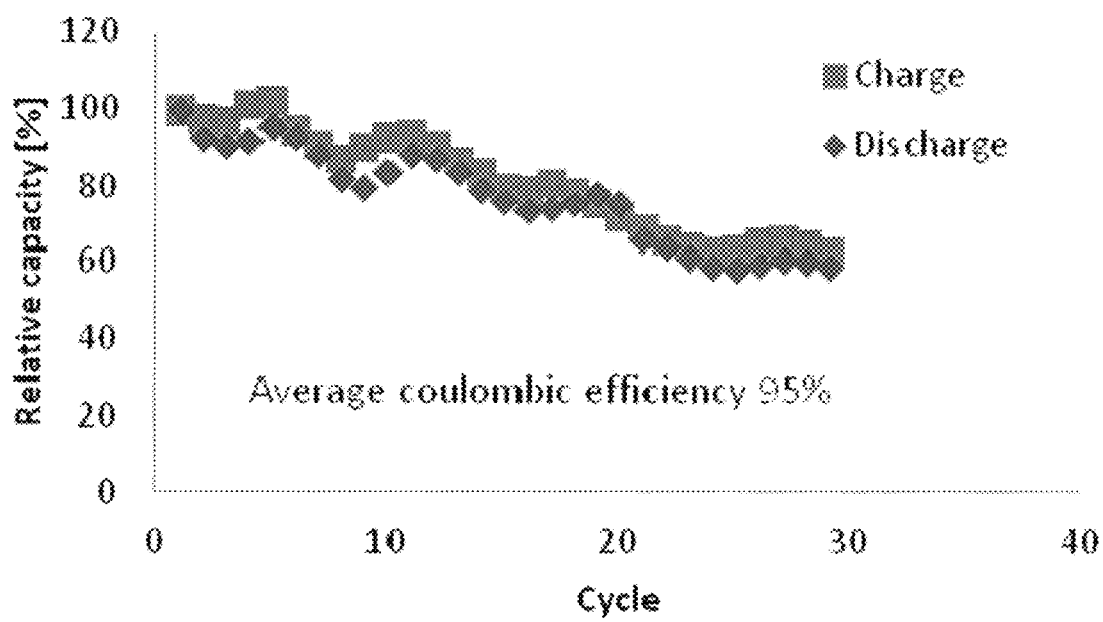

FIG. 10 is a graph showing the capacity of an exemplary lithium sulfur cathode loaded with about 1 mg/cm$^2$ Li$_2$S over the course of 30 charge-discharge cycles, using 10 weight percents of lithium bis(trifluoromethanesulfonyl(im-ide (LiTFSI) and 2 weight percents lithium nitrate in 1,3-dioxolane (DOL) and 1,2-demethoxyethane (DME) (1:1 weight ratio of DOL:DME) as electrolyte, a voltage range of 1.4-3 V and a current density of 0.09 mA/cm$^2$.

Figure 11:
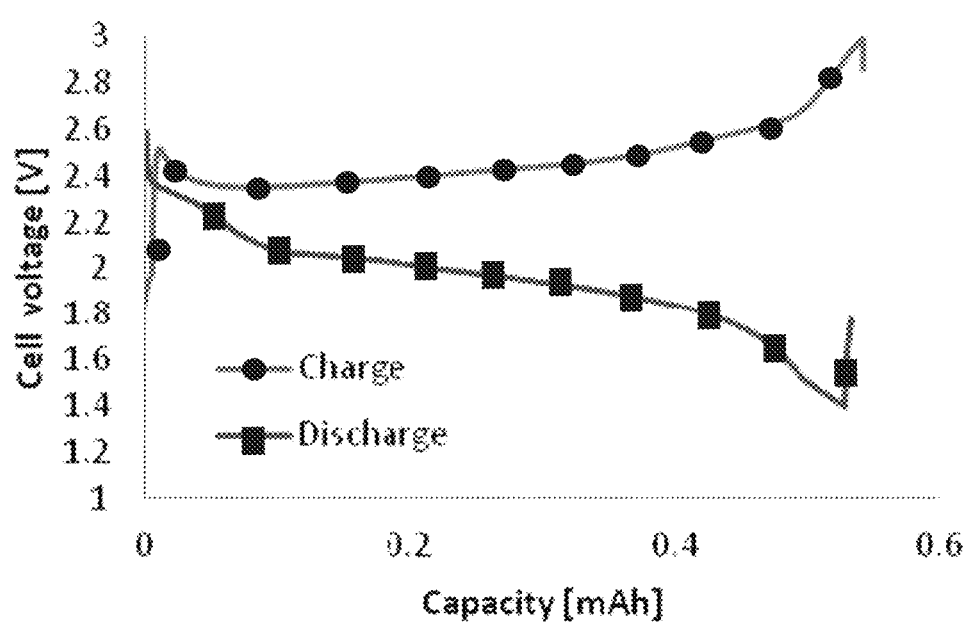

FIG. 11 is a graph showing cell voltage during a charge-discharge cycle of an exemplary lithium sulfur cathode loaded with about 1 mg/cm$^2$ Li$_2$S as a function of capacity, using 10 weight percents LiTFSI and 2 weight percents lithium nitrate in DOL and DME (1:1 weight ratio of DOL:DME) as electrolyte and a current density of 0.03 mA/cm$^2$.

Figure 12:
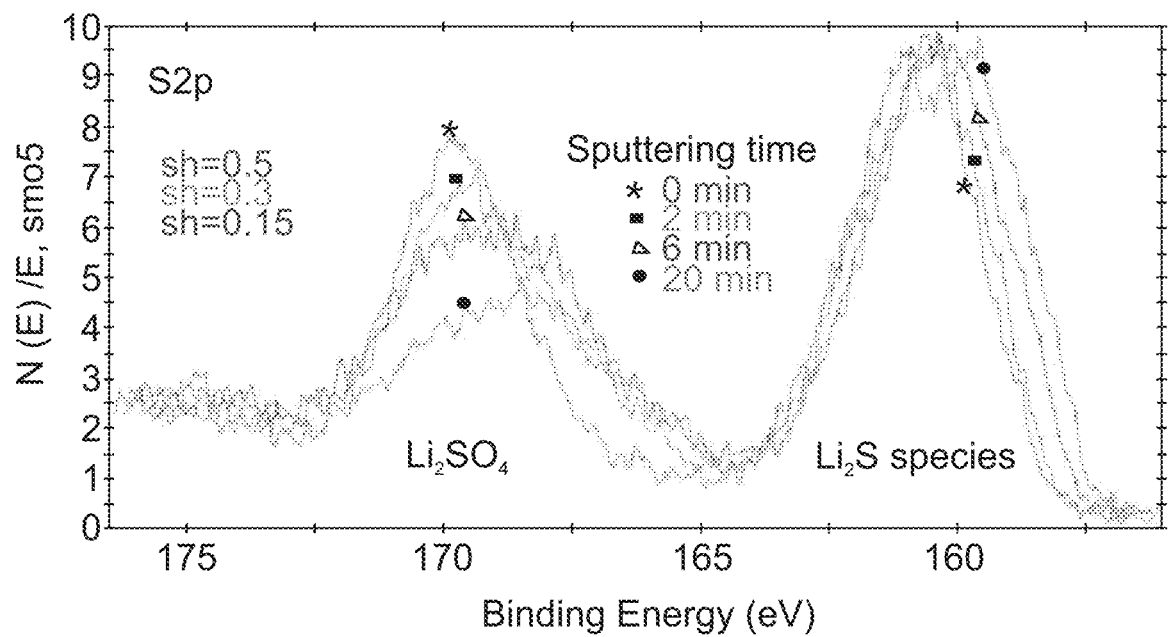

FIG. 12 is an X-ray photoelectron spectrograph of an exemplary composition-of-matter showing peaks corresponding to Li$_2$SO$_4$ and lithium sulfides and/or polysulfides (Li$_2$S species) after 0, 2, 6 or 20 minutes of sputtering.

Figure 13:
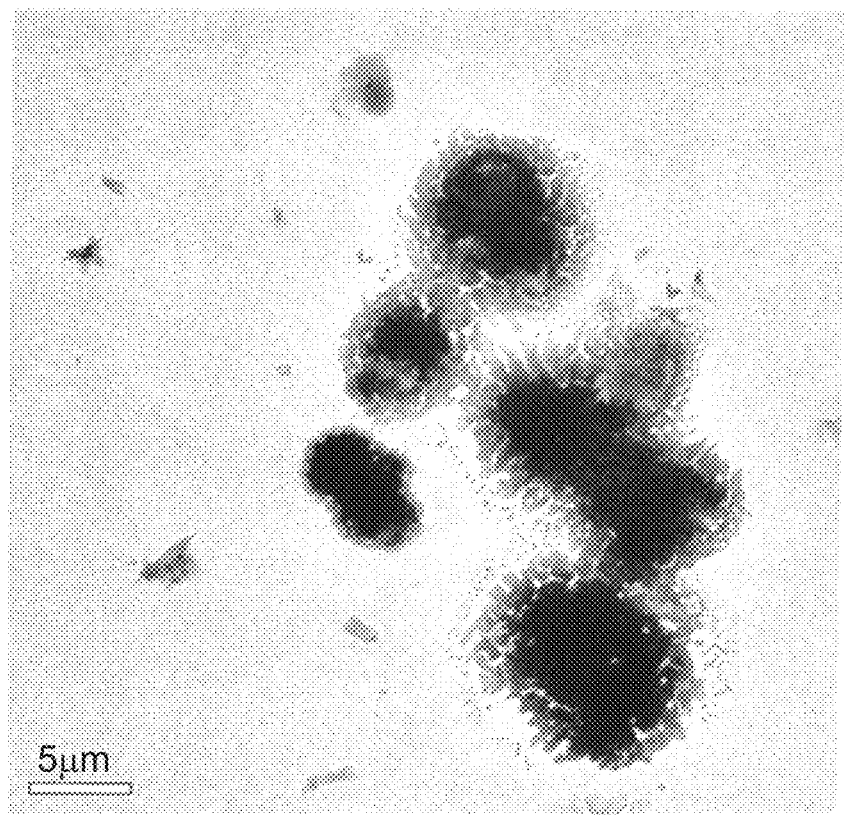

FIG. 13 presents a tunneling electron microscopy image of exemplary coated particles comprising a lithium sulfide core and a lithium carbonate shell (scale bar=5 μm).

Figure 14A:
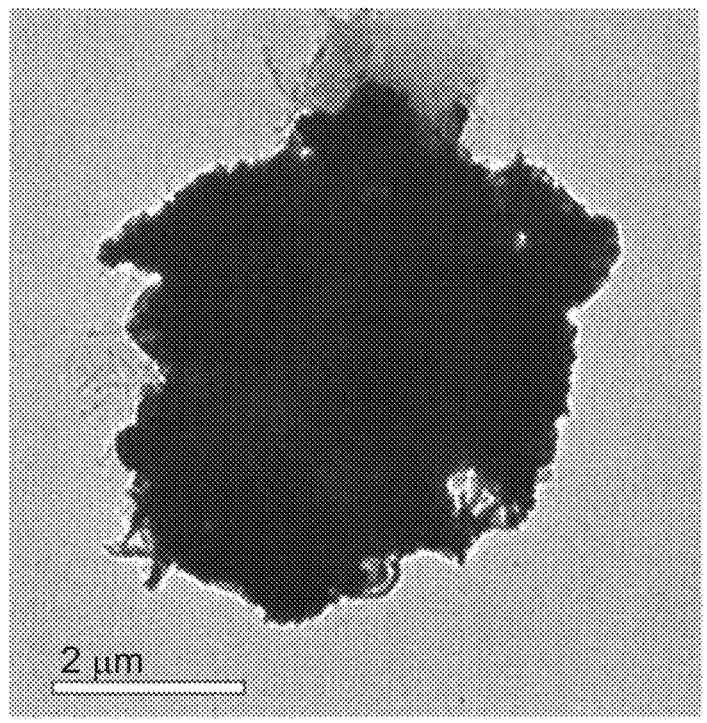
Figure 14B:
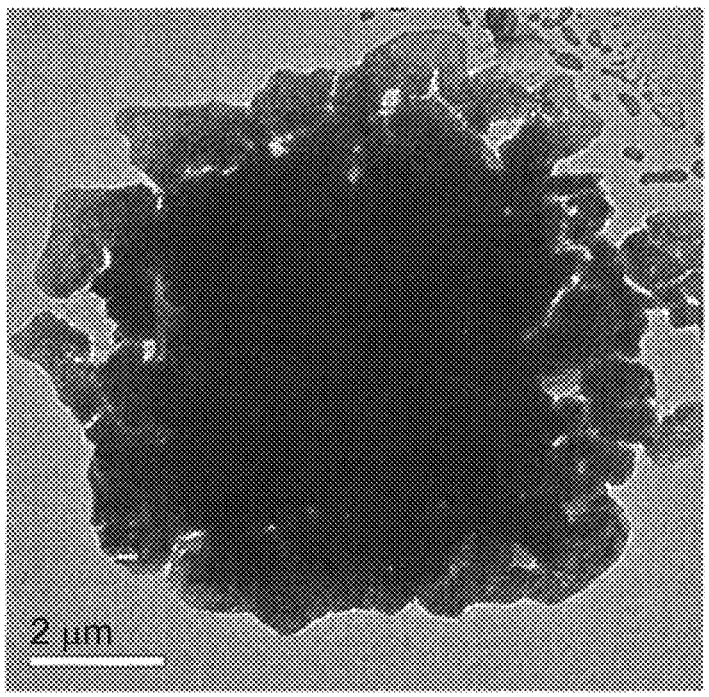

FIGS. 14A and 14B present tunneling electron microscopy images of exemplary particles comprising lithium sulfide with (FIG. 14B) and without (FIG. 14A) a lithium carbonate shell (scale bar=2 μm).

Figure 15:

FIG. 15 presents an environmental scanning electron microscopy image of exemplary coated particles (scale bar=2 μm).

DESCRIPTION OF SPECIFIC EMBODIMENTS OF THE INVENTION

The present invention, in some embodiments thereof, relates to electrochemistry and more particularly, but not exclusively, to compositions comprising an alkali metal which can be used in an electrode of an alkali metal battery.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present inventors have envisioned that encapsulation of particles for releasing and absorbing an alkali metal (e.g., during charging and discharging of a battery) when the particles are saturated with the alkali metal overcomes significant obstacles in battery technology utilizing alkali metal ions. In particular, such encapsulation advantageously results in each particle being trapped within a protective cage which matches the maximal volume of the particle, that is, when the particle is saturated with the alkali metal. Release of the alkali metal from the particles (e.g., due to a suitable electric current) results in a decrease in the particle volume, leaving a void within the cage. The cages are resistant to expansion of the particles upon re-absorption of the alkali metal, because the particle volume does not exceed the volume in the cage at any stage of release or absorption of the alkali metal. Furthermore, such encapsulation facilitates control over the relative size of the void in each cage, and makes efficient use of space by avoiding voids which are considerably larger than needed to accommodate the particles. Furthermore, the encapsulation may be used for preparing both anodes and cathodes for alkali metal batteries.

The present inventors have further envisioned that the encapsulation described herein allows for the cages to be prepared from any of a wide variety of compounds, which may be selected to provide optimal ion conduction and/or electron conduction properties, as well as suitable insolubility in a surrounding liquid, such as an electrolyte solution.

While reducing the present invention to practice, the present inventors have encapsulated particles of a lithium sulfide and used them to assemble a cathode. The particles were encapsulated in a material composed primarily of lithium cation conductors, optionally with some electron conductors, which were sintered and/or melted to form a mechanically resistant cage (which can also be referred to as cation-permeable and optionally also electron-permeable membrane). The cathode exhibited a high capacity and high coulombic efficiency over the course of many charge-discharge cycles.

According to an aspect of some embodiments of the invention, there is provided a composition-of-matter comprising a plurality of particles, the particles comprising a substance reversibly releasing an alkali metal while decreasing in volume and absorbing said alkali metal while increasing in volume.

Particles:

In some embodiments of any one of the embodiments described herein, for at least a portion of the particles, and optionally for all of the particles, each particle is encapsulated within a volume enclosed by a shell or matrix which conducts cations of the alkali metal (cation permeable membrane, or cation-permeable shell or cation-permeable matrix), wherein a volume of the substance upon maximal absorption of the alkali metal does not exceed the volume enclosed by a shell or matrix, as described in detail hereinafter.

Herein, the phrase "alkali metal" encompasses lithium, sodium, potassium, rubidium and cesium and combinations thereof, and encompasses alkali metal atoms (e.g., metallic forms of alkali metals) and alkali metal cations (e.g., in solution and/or in a salt or a substance described herein).

According to some embodiments of any one of the embodiments described herein, the alkali metal is lithium.

Herein, the phrase "substance reversibly releasing an alkali metal while decreasing in volume and absorbing said alkali metal while increasing in volume" (also abbreviated to the phrase "substance reversibly releasing an alkali metal", the two aforementioned phrases being used interchangeably herein) encompasses a first form of the substance having a relatively high alkali metal content, a second form of the substance having a relatively low (optionally zero or close to zero, for example, less than 10% by molar concentration) alkali metal content, and all intermediate forms of the substance having intermediate alkali metal an content.

The phrase "reversibly releasing" means that the first form of the substance is capable of releasing, or releases, the alkali metal until the second form of the substance is obtained; the second form of the substance is capable of absorbing, or absorbs, the alkali metal until the first form of the substance is re-obtained; and the re-obtained first form of the substance is capable of re-releasing, or re-releases, the alkali metal. In each form of the substance, the alkali metal may independently be in the form of an atom and/or an ion (e.g., cation). Release and/or absorption (also referred to, respectively, as "de-insertion" and "insertion", or "de-intercalation" and "intercalation") of the alkali metal may involve oxidation and/or reduction of the alkali metal and/or the substance, e.g., conversion of an alkali metal atom to an ion or vice versa. The second form of the substance is typically characterized by a lower volume than the first form of the substance due to the loss of atoms via release of the alkali metal. In some embodiments, the alkali metal undergoes release and absorption in the form of alkali metal cations.

The amount of alkali metal which can be released and absorbed by a substance may be represented as the difference between an amount of alkali metal in the abovementioned first form of the substance and an amount of alkali metal in the abovementioned second form of the substance.

According to some embodiments of any one of the embodiments described herein, a concentration of alkali metal in the first form of the substance is greater than a concentration of alkali metal in the second form of the substance by at least 0.005 moles per $cm^3$. In some embodiments, a concentration of alkali metal in the first form of the substance is greater than a concentration of alkali metal in the second form of the substance by at least 0.01 moles per $cm^3$. In some embodiments, a concentration of alkali metal in the first form of the substance is greater than a concentration of alkali metal in the second form of the substance by at least 0.02 moles per $cm^3$. In some embodiments, a concentration of alkali metal in the first form of the substance is greater than a concentration of alkali metal in the second form of the substance by at least 0.05 moles per $cm^3$.

According to some embodiments of any one of the embodiments described herein, a weight percentage of alkali metal in the first form of the substance is greater than a weight percentage of alkali metal in the second form of the substance by at least 2%, for example, wherein a weight percentage of alkali metal in the second form is no more than 1% and a weight percentage of alkali metal in the first form is at least 3%. In some embodiments, a weight percentage of alkali metal in the first form of the substance is greater than a weight percentage of alkali metal in the second form of the substance by at least 5%. In some embodiments, a weight percentage of alkali metal in the first form of the substance is greater than a weight percentage of alkali metal in the second form of the substance by at least 10%. In some embodiments, a weight percentage of alkali metal in the first form of the substance is greater than a weight percentage of alkali metal in the second form of the substance by at least 20%. In some embodiments, a weight percentage of alkali metal in the first form of the substance is greater than a weight percentage of alkali metal in the second form of the substance by at least 50%. According to some embodiments of any one of the embodiments described herein, a molar percentage of alkali metal the percentage of atoms which are atoms of the alkali metal) in the first form of the substance is greater than a molar percentage of alkali metal in the second form of the substance by at least 20%, for example, wherein a molar percentage of alkali metal in the second form is no more than 5% and a molar percentage of alkali metal in the first form is at least 25%. In some embodiments, a molar proportion of alkali metal in the first form of the substance is greater than a molar proportion of alkali metal in the second form of the substance by at least 30%. In some embodiments, a molar proportion of alkali metal in the first form of the substance is greater than a molar proportion of alkali metal in the second form of the substance by at least 50%. In some embodiments, a molar proportion of alkali metal in the first form of the substance is greater than a molar proportion of alkali metal in the second form of the substance by at least 75%, for example, wherein a molar percentage of alkali metal in the second form is no more than 5% and a molar percentage of alkali metal in the first form is at least 80%.

As used herein, the phrase "volume of the substance upon maximal absorption of the alkali metal" refers to the volume of a first form of the substance, as described herein. The maximal absorption refers to the maximal degree of absorption under certain conditions (e.g., a specific range of electrochemical potentials). Thus, a single substance may be characterized by two or more distinct degrees of "maximal absorption", each degree being associated with different conditions. For example, under certain conditions sulfur may absorb an alkali metal (M) until a disulfide salt $M_2S_2$ is obtained (the maximal absorption being a 1:1 molar ratio of alkali metal to sulfur), whereas under other conditions sulfur may absorb additional alkali metal (M) until a sulfide salt $M_2S$ is obtained (the maximal absorption being a 2:1 molar ratio of alkali metal to sulfur).

As used herein, the phrase "volume enclosed by a shell or matrix" refers to the volume within a shell or matrix which is available for occupation by the substance reversibly releasing an alkali metal and does not include the volume occupied by components of the particles other than the substance reversibly releasing an alkali metal.

Any substance that can incorporate variable amounts of alkali metal atoms, and preferably which features changes in volume as described in the respective embodiments is contemplated.

Examples of a substance reversibly releasing an alkali metal include, without limitation, sulfur, a sulfide of the alkali metal and/or a polysulfide of the alkali metal (including mixtures thereof). It is to be appreciated that each of these substances may be considered as representing different degrees of alkali metal absorption for a single substance.

Without being bound by any particular theory, it is believed that sulfur, a sulfide of the alkali metal and/or a polysulfide of the alkali metal (including mixtures thereof) are particularly suitable for use in a cathode of an alkali metal battery.

In some embodiments of any one of the embodiments described herein relating to particles comprising a substance comprising sulfur, a sulfide of an alkali metal (e.g., lithium sulfide) and/or a polysulfide of an alkali metal (e.g., a lithium polysulfide), the substance is capable of reversibly releasing, or reversible releases, the alkali metal (e.g., lithium) while decreasing in volume and absorbing the alkali metal while increasing in volume, each of the particles being encapsulated within a volume enclosed by a shell or matrix which conducts conducting cations of the alkali metal, wherein an amount of sulfur atoms in each particle is such that a volume of a sulfide of an alkali metal (e.g., lithium sulfide) formed from the sulfur atoms and alkali metal (wherein all of the sulfur atoms are in the form of a sulfide, the sulfide being a state of maximal absorption of the alkali metal by the substance) does not exceed the volume enclosed by a shell or matrix. In some such embodiments, the alkali metal is lithium and the sulfide is lithium sulfide ($Li_2S$).

Herein, the term "polysulfide" refers to an anion having the formula $S_n^{2-}$; wherein n is at least 2, typically from 2 to 8, and salts of said anion (e.g., salts having the formula $M_2S_n$, wherein M is an alkali metal). When n is 2, the polysulfide is also referred to as a "disulfide".

In some embodiments of any one of the embodiments described herein, the particles further comprise a catalyst of redox reactions of sulfur, sulfides and/or polysulfides, for example, in embodiments, wherein the particle size is relatively small, for example, 10 nm. Optional catalysts include nanoparticles of nickel, cobalt, manganese and/or iron, and alloys, sulfides and/or oxides thereof.

In some embodiments of any one of the embodiments described herein, the substance upon maximal absorption of the alkali metal is a sulfide of the alkali metal (e.g., $M_2S$, wherein M is the alkali metal).

In some embodiments of any one of the embodiments described herein, the substance upon maximal absorption of the alkali metal is a disulfide of the alkali metal (e.g., $M_2S_2$, wherein M is the alkali metal).

In some embodiments of any one of the embodiments described herein, the substance reversibly releasing an alkali metal comprises (and optionally consists of):

a) a compound or element (e.g., other than an alkali metal) which forms an alloy with the alkali metal; and/or b) an alloy of the alkali metal with the compound or element.

It is to be appreciated that the alloy and the compound or element which forms an alloy represent different degrees of alkali metal absorption for a single substance, wherein the substance is an alloy upon maximal absorption of the alkali metal.

Herein, a compound or element "which forms an alloy" with an alkali metal refers to a compound or element which exhibits the property of being capable of forming, or of forming, an alloy with the alkali metal upon combination with the alkali metal, as opposed, for example, to remaining in a separate phase from the alkali metal. Optionally, the alloy is characterized by a specific stoichiometric proportion of alkali metal atoms, e.g., according to any of the respective embodiments described herein. The skilled person will be readily capable of determining which compounds an elements form an alloy with any given alkali metal.

Without being bound by any particular theory, it is believed that alkali metal alloys and/or compounds or elements suitable for forming such as alloy are particularly suitable for use in an anode of an alkali metal battery.

Herein the term "alloy" refers to a mixture or solid solution composed of a metal (e.g., the alkali metal described herein) and one or more other elements, at any molar ratio of metal to the other element(s). In some embodiments, the alloy may comprise (e.g., upon maximal absorption of the alkali metal) a single phase of alkali metal and the other element(s). The compound or element which forms an alloy with the alkali metal may be an element or a mixture of elements (other than the alkali metal according to any of the respective embodiments described herein). Preferably, the compound(s) or element(s) which form an alloy with the alkali metal is not an alkali metal.

Herein, references to a "compound" are intended to encompass elements and mixtures of elements, unless explicitly indicated otherwise.

According to some embodiments of any one of the embodiments described herein, the compound which forms an alloy with an alkali metal (e.g., lithium) comprises (and optionally consists of) silicon, tin, antimony, germanium, lead, bismuth, magnesium, aluminum, and/or an alloy of any one or more of the aforementioned elements with any other element, including, for example, mixtures (e.g., alloys) of any two or more of the aforementioned elements thereof. Antimony-manganese alloy is an example of a suitable antimony alloy. Germanium-tin alloy is a suitable example of an alloy of two of the aforementioned elements.

In some embodiments of any one of the embodiments described herein, the alloy may be described by the general formula $M_xA$, wherein M is the alkali metal, for example, lithium, sodium and/or potassium, and A is an element which forms an alloy with the alkali metal, for example, silicon, tin, antimony, germanium, lead, bismuth, and/or mixtures thereof. Examples of such alloys include, without limitation, alloys wherein A is silicon and x=4.2 (e.g., $Li_{4.2}Si$) or x=4.4 (e.g., $Li_{4.4}Si$), A is tin and x=4.4 (e.g., $Li_{4.4}Sn$), A is antimony and x=3 (e.g., $Li_3Sb$), A is germanium and x=4.4 (e.g., $Li_{4.4}Ge$), A is lead and x is about 0.2 (e.g., $Li_{17}Pb_{83}$), A is bismuth and x=3 (e.g., $Li_3Bi$), A is antimony-manganese and x is about 0.5 (e.g., $Li_{32.2}Sb_{31.8}Mn_{36}$), and wherein A is a germanium-tin alloy (e.g., $Ge_{1-y}Sn_y$, wherein y=0.1-0.4).

According to some embodiments of any one of the embodiments described herein, silicon, tin and/or antimony are used to form an alloy with any alkali metal, optionally lithium and/or sodium. In some embodiments, the alkali metal comprises sodium and the alloy upon maximal absorption of sodium has a ratio of from 0.1 to 0.5 sodium atoms per atom of silicon, tin and/or antimony.

According to some embodiments of any one of the embodiments described herein relating to alloy having the general formula $M_xA$ upon maximal absorption of the alkali metal, the alkali metal M is lithium, such that the alloy has the formula $Li_xA$, wherein A is an element which forms an alloy with lithium, for example, silicon, tin, aluminum, magnesium, antimony and/or mixtures (e.g., alloys) thereof. In some embodiments, x is in a range of from 2 to 4.4 (optionally from 2.5 to 4.4) when A is silicon (Si) and/or tin (Sn), and x is in a range of from 1 to 3 when A is antimony (Sb), aluminum (Al) and/or magnesium (Mg). Examples of such alloys include, without limitation, $Li_xSi$ wherein x is in a range of from 2.5 to 4.4, $Li_xSn$ wherein x is in a range of from 2.5 to 4.4 and $Li_xSb$ wherein x is in a range of from 1 to 3.

Optionally, the amount of alkali metal (e.g., lithium) upon maximal absorption is selected so as to have a suitable melting point (e.g., a melting point higher than that of a material used to form the shell or matrix), as described herein according to any of the respective embodiments.

According to some embodiments of any one of the embodiments described herein, an average size of the particles is in a range of from 1 to 1000 nm, optionally from 30 to 300 nm. In some embodiments, the particle size (e.g., average maximal size) is less than 20 nm.

According to some embodiments of any one of the embodiments described herein, an average size of the particles is in a range of from 1000 to 5000 nm.

According to some embodiments of any one of the embodiments described herein, an average size of the particles is in a range of from 100 to 1000 nm.

According to some embodiments of any one of the embodiments described herein, an average size of the particles is in a range of from 10 to 100 nm.

According to some embodiments of any one of the embodiments described herein, an average size of the particles is in a range of from 30 to 300 nm.

In some embodiments of any one of the embodiments described herein, the average size of the particles is less than 20 nm. In some such embodiments, the average size is from 1 to 10 nm.

Herein, an "average size" refers to the mean size. The size of any given particle or powder grain described herein may be determined as the maximal length of the particle, as viewed from one angle (e.g., as is typical in microscopy). Non-limiting examples of additional materials (e.g., other than a compound comprising the alkali metal and/or the substance reversibly releasing an alkali metal) which may be included in the particles include, without limitation, an ion conductor and/or electron conductor described herein.

Examples of additional materials which may optionally be incorporated in the particles according to some embodiments of any one of the embodiments described herein include, without limitation, molybdenum sulfide, tungsten disulfide, copper sulfide and nickel (e.g., nickel nanoparticles).

Shell/Matrix:

As mentioned hereinabove, in some embodiments, at least a portion of the particles (according to any of the embodiments described herein relating to the features of the particles) are each encapsulated within a volume enclosed by a shell or matrix, wherein a volume of the alloy in the particle upon maximal absorption of the alkali metal does not exceed the volume enclosed by the shell or matrix.

Herein, the phrase "shell or matrix" refers to a substance having a shape which encompasses at least one void (e.g., a void occupied at least in part by a particle described herein). Typically, the term "shell" refers to a form (e.g., a membrane) encompassing a single void or a small number of voids, whereas the term "matrix" refers to a continuous phase (e.g., a network of interconnected membranes) encompassing many voids (which may be considered as many shells joined together). However, there is no significant difference between the substance of a shell and a matrix, and the terms "shell", "matrix" and "shell or matrix" are used interchangeably herein.

According to some embodiments of any one of the embodiments described herein, the shell or matrix is selected (e.g., the components thereof are selected) so as to be insoluble in a liquid comprising an electrolyte (e.g., a liquid according to any of the respective embodiments described herein), for example, a liquid comprising an electrolyte in an electrochemical half cell (e.g., in a battery) in which the composition-of-matter is intended to be included (e.g., according to any of the respective embodiments described herein).

In some embodiments of any one of the embodiments described herein, the shell or matrix is preferably substantially free of pores and/or holes of a size sufficient to allow escape of the substance reversibly releasing the alkali metal from within the shell or matrix.

In some embodiments, the shell or matrix is substantially free of pores of at least 2 nm in diameter. In some embodiments, the shell or matrix is substantially free of pores of at least 1 nm in diameter. In some embodiments, the shell or matrix is substantially free of pores of at least 0.5 nm in diameter. In some embodiments, the shell or matrix is substantially free of pores of at least 0.3 nm in diameter.

Without being bound by any particular theory, it is believed that pores smaller than the dimensions described herein will allow only very slow escape of polysulfides from the particles are will not allow escape at all.

As used herein, the term "pore" refers to a hole in a shell or matrix which connects a void within a shell or matrix with a volume external to the shell or matrix.

As used herein, the phrase "substantially free of pores" means that at least 50% of the particles (optionally at least 60%, optionally at least 70%, optionally at least 80%, optionally at least 90%, optionally at least 95% and optionally at least 99% of the particles) are coated by a shell or matrix which does not include a pore (e.g., a pore of a diameter described herein) adjacent to the particle (e.g., which could allow escape of contents of the particle through the pore).

According to some embodiments of any one of the embodiments described herein, a ratio of the volume of the substance upon maximal absorption of the alkali metal to the volume enclosed by a shell or matrix is uniform among at least 90% of the particles.

As used herein, the term "uniform" refers to set of values (e.g., the abovementioned ratio for different particles) characterized by a standard deviation which is no more than 20% of the mean of the values. In some embodiments of any one of the embodiments described herein relating to a uniform volume, the standard deviation is no more than 10% of the mean. In some embodiments, the standard deviation is no more than 5% of the mean. In some embodiments, the standard deviation is no more than 2% of the mean. In some embodiments, the standard deviation is no more than 1% of the mean.

According to some embodiments of any one of the embodiments described herein, a volume of the substance upon maximal absorption of the alkali metal is at least 80% of the volume enclosed by a shell or matrix (e.g., calculated as an average for a plurality of particles). In some embodiments, the volume is at least 90%. In some embodiments, the volume is at least 95%. In some embodiments, the volume is at least 98%. In some embodiments, the volume is at least 99%.

According to some embodiments of any one of the embodiments described herein, the shell or matrix which conducts cations of the alkali metal comprises an ion conductor comprising the alkali metal. An ion conductor comprising the alkali metal in a shell or matrix is different than the substance reversibly releasing the alkali metal in a particle enclosed within the shell or matrix (e.g., the shell or matrix is chemically distinct from the particle(s) enclosed therein). The ion conductor may be, for example, a salt (optionally a chloride, bromide, fluoride, carbonate and/or sulfate salt of the alkali metal), a glass and/or a ceramic. In some embodiments, the ion conductor is characterized by a transference number for cations of the alkali metal (e.g., as determined using a standard technique) which is at least 0.7, optionally at least 0.8, optionally at least 0.9, optionally at least 0.95, optionally at least 0.98, and optionally at least 0.99.

According to some embodiments of any one of the embodiments described herein, the ion conductor comprises (and optionally consists of) a carbonate salt of the alkali metal, a sulfate salt of the alkali metal, a fluoride salt of the alkali metal, a metal sulfide and/or disulfide comprising the alkali metal, a metal oxide (e.g., an oxide of an alkali metal, Ti, Ni, Co, Mn, Fe or any mixture thereof) comprising the alkali metal, and/or a metal phosphate comprising the alkali metal.

Examples of suitable metal disulfides include, without limitation, $TiS_2$, $MoS_2$, $WS_2$, $CoS_2$ and $FeS_2$. $CoO_2$ and $Ni_{0.33}Mn_{0.33}Co_{0.33}O_2$ are non-limiting examples of suitable metal oxides. $FePO_4$ is a non-limiting example of a suitable metal phosphate. CuS is non-limiting example of a suitable metal sulfide.

The metal sulfide, metal disulfide, metal oxide and/or metal phosphate comprising the alkali metal may be, for example, in an alkalated form. $LiTiS_2$, $LiMoS_2$, $LiCoS_2$ and $LiFeS_2$ are non-limiting examples of a suitable metal disulfide in alkalated form (e.g., an alkalated form of $TiS_2$, $MoS_2$, $CoS_2$ and $FeS_2$, respectively). $LiCoO_2$ and $LiNi_{0.33}Mn_{0.33}Co_{0.33}O_2$ are non-limiting examples of suitable metal oxides in alkalated form (e.g., an alkalated form of $CoO_2$ and $Ni_{0.33}Mn_{0.33}Co_{0.33}O_2$, respectively). $LiFePO_4$ is a non-limiting example of a suitable metal phosphate in alkalated form (e.g., an alkalated form of $FePO_4$). LiCuS is non-limiting example of a suitable metal sulfide in alkalated form (e.g., an alkalated form of CuS).

As used herein, the term "alkalated" refers to a compound comprising an alkali metal, wherein the compound can reversibly release some or all of the alkali metal, resulting in a stable compound with less alkali metal or with no alkali metal (a "non-alkalated" compound). The alkalated compound and non-alkalated compound may be considered as different forms of a single compound having a variable amount of alkali metal, including amounts which are optionally intermediate between the fully alkalated forms and the non-alkalated forms described herein.

For example, alkalated metal disulfides, oxides and phosphates may release or absorb various numbers of lithium ions concurrently with release or acceptance, respectively, of a corresponding number of electrons by metal ions therein, thereby preserving a substantially neutral electric charge.

Herein, the terms "CuS", "LiCuS" and "copper sulfide" encompass compounds having a ratio of copper atoms to sulfur atoms in a range of from 0.5 to 2 (i.e., $Cu_xS_y$, wherein x/y is from 0.5 to 2), preferably from 0.5 to 1.5. Many forms of copper sulfide comprise disulfide anions (e.g., in combination with sulfide ions), and may thus also be considered a type of metal disulfide.

$Li_4Ti_5O_{12}$ is an additional example of a suitable metal oxide comprising an alkali metal. Alkalated forms of $Li_4Ti_5O_{12}$ include, for example, $Li_7Ti_5O_{12}$.

According to some embodiments of any one of the embodiments described herein, the shell or matrix comprises at least one compound comprising the alkali metal (e.g., a conductor of the alkali metal cation, according to any of the respective embodiments described herein). In some embodiments, the shell or matrix comprises at least one salt of the alkali metal, according to any of the respective embodiments described herein.

According to some embodiments (e.g., wherein the alkali metal comprises lithium, according to any of the respective embodiments described herein), the shell or matrix comprises at least one lithium compound. Examples of suitable lithium compounds include, without limitation, lithium sulfate, lithium fluoride, lithium carbonate, $Li_4Ti_5O_{12}$ and any combinations thereof.

According to some embodiments of any one of the embodiments described herein, the shell or matrix comprises at least one additional compound (other than a compound comprising the alkali metal).

Examples of suitable additional compounds which may optionally be included in the shell or matrix include, without limitation, calcium fluoride and alumina.

Examples of suitable additional compounds which may optionally be included in the particles and/or shell or matrix include, without limitation, graphite and nickel.

According to some embodiments, the salt of the alkali metal, according to any of the respective embodiments described herein, is mixed with an ionic liquid (e.g., an ionic liquid described herein), optionally in an amount of up to 25% by volume of the mixture of salt and ionic liquid. Optionally, the mixing is performed by adding the ionic liquid to the salt before milling the salt.

According to some embodiments of any one of the embodiments described herein, the ion conductor (e.g., a salt of an alkali metal) is doped with at least one divalent cation and/or trivalent cation, optionally by adding a chloride, bromide, fluoride, carbonate and/or sulfate salt of the divalent and/or trivalent cation. Examples of suitable divalent and trivalent cations include, without limitation, $Mg^{2+}$, $Ca^{2+}$, $Ba^{2+}$, $Sr^{2+}$, $Ga^{3+}$, $Al^{3+}$ and any combinations thereof. In some embodiments, the divalent cation is $Mg^{2+}$ and/or $Ca^{2+}$.

In some embodiments, the ion conductor comprises at least one lithium-containing compound described herein (according to any of the respective embodiments) doped with $Ca^{2+}$.

According to some embodiments, a compound (e.g., a salt according to any of the respective embodiments described herein) in the shell or matrix, optionally a lithium compound (e.g., a lithium salt according to any of the respective embodiments described herein), is doped with a divalent cation, optionally magnesium and/or calcium.

Herein, the term "doped" refers to replacement of a small portion of an ion (e.g., an alkali metal cation) in a salt with an equivalent amount of another ion (e.g., an amount of divalent cation and/or trivalent cation having about the same total charge as the replaced ion).

Without being bound by any particular theory, it is believed that doping in the shell or matrix with a divalent and/or trivalent cation substantially increases the conductivity of the shell or matrix to the alkali metal ions.

According to some embodiments of any one of the embodiments described herein, the ion conductor has a melting point lower than a melting point of the substance upon maximal absorption of the alkali metal (e.g., $Li_2S$ or $Li_2S_2$).

In some embodiments, the ion conductor has a melting point which is at least 10° C. lower than a melting point of the substance upon maximal absorption of the alkali metal. In some embodiments, the ion conductor has a melting point which is at least 20° C. lower than a melting point of the substance upon maximal absorption of the alkali metal. In some embodiments, the ion conductor has a melting point which is at least 50° C. lower than a melting point of the substance upon maximal absorption of the alkali metal. In some embodiments, the ion conductor has a melting point which is at least 100° C. lower than a melting point of the substance upon maximal absorption of the alkali metal. In some embodiments, the ion conductor has a melting point which is at least 200° C. lower than a melting point of the substance upon maximal absorption of the alkali metal.

In some embodiments of any one of the embodiments described herein, the ion conductor comprises a mixture of compounds, which allows for lowering of the melting point (optionally to below the melting point of any one of the compounds in the ion conductor in a pure form).

According to some embodiments of any one of the embodiments described herein, the shell or matrix comprises at least one electron conductor. An electron conductor described herein may be a different compound than an ion conductor or a compound which is both an electron conductor and an ion conductor (also referred to herein as an "electron-ion conductor").

Herein, the term "electron conductor" encompasses substances capable of conduction of, or which conduct, electrons per se and/or electron holes, under an applied electric potential.

According to some embodiments of any one of the embodiments described herein relating to an electron conductor, the electron conductor may comprise (and optionally consist of), for example, carbon nanoparticles, metal nanoparticles, a metal sulfide a metal disulfide, metal phosphate and/or a metal oxide. In some embodiments, the metal sulfide, metal disulfide and/or metal oxide is doped (e.g., to enhance electron conduction). The metal of the aforementioned metal nanoparticles, metal sulfide, metal disulfide and/or metal oxide may be, for example, nickel, cobalt, iron, copper, titanium, and/or tin. $TiO_2$ and tin oxides, which may optionally be doped (e.g., to enhance electron conduction), are examples of suitable metal oxides for use as electron conductors.

As used herein, the phrase "carbon nanoparticles" encompasses all nanoparticles which are at least 50% carbon by weight, including, for example, particles comprising carbon black, graphite, carbon nanotubes, graphene, graphene oxide and combinations thereof.

As used herein, the phrase "metal nanoparticles" refers to nanoparticles of a metal and/or a metal oxide.

In some embodiments of any one of the embodiments described herein, the metal nanoparticles comprise nickel.

According to some embodiments of any one of the embodiments described herein, the shell or matrix comprises at least one ion conductor (e.g., according to any of the respective embodiments described herein) and at least one electron conductor (e.g., according to any of the respective embodiments described herein). An ion conductor and electron conductor may optionally be a single compound, i.e., an electron ion conductor, which may be used as a sole conductor or in combination with one or more additional ion conductors and/or electron conductors.

The electron-ion conductor may optionally be a metal sulfide and/or disulfide, a metal oxide and/or a metal phosphate according to any of the respective embodiments described herein, for example, in an alkalated form. $MoS_2$, $TiS_2$, $CoS_2$, $FeS_2$ and $CuS$, which may optionally be in alkalated form (e.g., as $LiMoS_2$, $LiTiS_2$, $LiCoS_2$, $LiFeS_2$ and $LiCuS$, respectively) or non-alkalated form, are non-limiting examples of suitable electron-ion conductors.

In some embodiments of any one of the embodiments described herein, the shell or matrix is sufficiently thin so as to allow electron conduction without inclusion of an electron conductor.

In some embodiments of any one of the embodiments described herein, a thickness of the shell or matrix is no more than 100 nm. In some embodiments, the thickness is no more than 50 nm. In some embodiments, the thickness is no more than 25 nm. In some embodiments, the thickness is no more than 12.5 nm. In some embodiments, the thickness is no more than 5 nm. In some embodiments, the thickness is at least 0.5 nm. In some embodiments, the thickness is from 0.5 to 5 nm.

According to some embodiments of any one of the embodiments described herein, the shell or matrix is formed from particles (e.g., particles of an electron conductor, ion conductor and/or electron-ion conductor described herein) having a size (e.g., average size) in a range of from 0.5 to 100 nm. In some embodiments, the average size of the particles from which the shell or matrix is formed is in a range of from 0.5 to 25 nm. In some embodiments, the average size of the particles from which the shell or matrix is formed is in a range of from 1 to 20 nm. In some embodiments, the average size of the particles from which the shell or matrix is formed is in a range of from 3 to 30 nm. In some embodiments, the shell or matrix is formed from particles having an average size in at least one of the aforementioned ranges, and the particles comprising the substance reversibly releasing an alkali metal have a size (e.g., average size) of from 100 to 500 nm, preferably 30 to 300 nm.

In some embodiments of any one of the embodiments described herein, an average size of the particles from which the shell or matrix is formed is in a range of from 0.5% to 20%, and optionally from 5% to 20%, of an average size of the particles comprising the substance reversibly releasing an alkali metal.

Without being bound by any particular theory, it is believed that substantially smaller particles tend to accumulate in interstices between larger particles, and thereby may readily form a shell or matrix enclosing the larger particles upon merging of the smaller particles, for example, by melting and/or sintering.

In some embodiments of any one of the embodiments described herein, the particles from which the shell or matrix is formed are fused by sintering and/or partial melting.

According to some embodiments of any one of the embodiments described herein, the composition-of-matter is in a form of a powder. Grains of such a powder may comprise a single particle (within a shell), and/or multiple particles (e.g., within a common matrix). In some embodiments, the powder grains have an average size in a range of from 0.01 to 0.1 µm. In some embodiments, the powder grains have an average size in a range of from 0.1 to 1 µm. In some embodiments, the powder grains have an average size in a range of from 1 to 10 µm.

It is to be understood that any one of the embodiments of invention described herein relating to a feature described herein may be combined with any one of the embodiments of invention described herein relating to another feature described herein, unless the features are incompatible. For example, a substance reversibly releasing an alkali metal according to any one of the embodiments described herein relating to such a substance may optionally be combined with a shell or matrix according to any one of the embodiments described herein relating to the shell or matrix, with an ion conductor according to any one of the embodiments described herein relating to an ion conductor, and/or with an electron conductor according to any one of the embodiments described herein relating to an electron conductor, and may optionally be utilized in a form of a battery according to any one of the embodiments described herein relating to a battery, and/or prepared according to a process according to any one of the embodiments described herein relating to a process, except when the features are incompatible.

Utilization of Composition-of-Matter:

According to another aspect of embodiments of the invention, there is provided an electrochemical half cell comprising an electrode which comprises a composition-of-matter which comprises a substance reversibly releasing an alkali metal, according to any of the respective embodiments described herein, and a liquid comprising an electrolyte, optionally an electrolyte solution.

According to another aspect of embodiments of the invention, there is provided an electrochemical half cell comprising a cathode which comprises a composition-of-matter according to any of the embodiments described herein wherein the substance reversibly releasing an alkali metal is sulfur, a sulfide of the alkali metal and/or a polysulfide of the alkali metal, the half cell further comprising a liquid comprising an electrolyte, optionally an electrolyte solution.

According to another aspect of embodiments of the invention, there is provided an electrochemical half cell comprising an anode which comprises a composition-of-matter according to any of the embodiments described herein wherein the substance reversibly releasing an alkali metal is a compound which forms an alloy with the alkali metal and/or an alloy comprising the alkali metal, the half cell further comprising a liquid comprising an electrolyte, optionally an electrolyte solution.

According to some embodiments of any of the embodiments relating to an electrochemical half cell described herein, the shell or matrix which conducts cations of the alkali metal is insoluble in the liquid comprising an electrolyte.

According to some embodiments of any one of the embodiments described herein, the liquid comprising an electrolyte comprises an ionic liquid (e.g., pyridine and/or pyrrollidinium cations), for example, an ionic liquid known in the art to be suitable for an alkali metal ion sulfur battery. The ionic liquid may optionally comprise a cation such as a 1,3-dialkylimidazolium (e.g., 1-ethyl-3-methylimidazolium, 1-butyl-3-methylimidazolium and/or 1-hexyl-3-methylimidazolium), a 1,2,3-trialkylimidazolium (e.g., 1-butyl-2,3-dimethylimidazolium), a 1,3-dialkylpyrimidinium, an N-alkylpyridinium (e.g., N-octylpyridinium), an N-alkylisoquinolinium, an N-alkylpyrrolium, an N,N-dialkylpyrrolidinium (e.g., 1-methyl-1-propylpyrrolidinium, 1-methyl-1-butylpyrrolidinium and/or 1-methyl-1-octylpyrrolidinium), and N,N-dialkylpiperidinium (e.g., 1-methyl-1-propylpiperidinium, 1-methyl-1-butylpiperidinium and/or 1-methyl-1-octylpiperidinium); and/or an anion such as bis(trifluoromethylsulfonyl)imide ("bistriflimide"), tetrafluoroborate, hexafluorophosphate and/or halide; and/or any combinations thereof.

Examples of ionic liquids suitable for an alkali metal ion battery (e.g., an alkali metal ion sulfur battery) include, without limitation:

1-ethyl-3-methylimidazolium salts such as 1-ethyl-3-methylimidazolium bis(trifluoromethylsulfonyl)imide and 1-ethyl-3-methylimidazolium tetrafluoroborate;

1-butyl-3-methylimidazolium salts such as 1-butyl-3-methylimidazolium bis(trifluoromethylsulfonyl)imide and 1-butyl-3-methylimidazolium tetrafluoroborate;

1-hexyl-3-methylimidazolium salts such as 1-hexyl-3-methylimidazolium bis(trifluoromethylsulfonyl)imide and 1-hexyl-3-methylimidazolium tetrafluoroborate;

1-butyl-2,3-dimethylimidazolium salts such as 1-butyl-2,3-dimethylimidazolium bis(trifluoromethylsulfonyl)imide and 1-butyl-2,3-dimethylimidazolium tetrafluoroborate;

N-octylpyridinium salts such as N-octylpyridinium tetrafluoroborate;

N-butyl-4-methylpyridinium salts such as N-butyl-4-methylpyridinium tetrafluoroborate and N-butyl-4-methylpyridinium hexafluorophosphate;

1-methyl-1-propylpyrrolidinium ([MPPyrro]$^+$) salts;
1-methyl-1-butylpyrrolidinium ([MBPyrro]$^+$) salts;
1-methyl-1-propylpiperidinium ([MPPip]$^+$) salts;
1-methyl-1-butylpiperidinium ([MBPip]$^+$) salts;
1-methyl-1-octylpyrrolidinium ([MOPyrro]$^+$) salts; and
1-methyl-1-octylpiperidinium ([MOPip]$^+$) salts.

According to some embodiments of any one of the embodiments described herein relating to an electrochemical half cell, the composition-of-matter is in a form of a powder, and the powder is attached by a binder to a current collector, thereby forming an electrode.

According to another aspect of embodiments of the invention, there is provided a rechargeable alkali metal ion battery comprising at least one electrochemical half cell according to any of the respective embodiments described herein. The battery may comprise any number of electrochemical cells, of which some or all comprise at least one electrochemical half cell according to any of the respective embodiments described herein. In some embodiments, the battery comprises at least one electrochemical cell comprising two electrochemical half cells described herein, one comprising an anode according to any of the respective embodiments described herein and one comprising a cathode according to any of the respective embodiments described herein.

Herein, the phrase "alkali metal ion battery" refers to a battery (e.g., comprising one or more electrochemical cells) wherein an electrochemical reaction which provides at least a portion of the electric power generated by the battery comprises movement of an alkali metal ion from one electrode (e.g., an anode) to another electrode (e.g., a cathode).

Herein, the phrase "rechargeable alkali metal ion battery" refers to an alkali metal ion battery (as defined herein) designed and/or identified for re-use upon recharging the battery by application of a suitable electric potential.

According to another aspect of embodiments of the invention, there is provided a rechargeable alkali metal ion battery comprising at least one electrochemical half cell comprising a cathode which comprises sulfur, a sulfide of the alkali metal and/or a polysulfide of the alkali metal, according to any of the respective embodiments described herein, the battery further comprising an alkali metal ion anode (e.g., any anode known in the art to be suitable for an alkali metal ion battery). The battery may comprise any number of electrochemical cells, of which some or all comprise at least one electrochemical half cell according to any of the respective embodiments described herein.

According to some embodiments, the anode comprises a porous alkali metal-absorbing material (e.g., such as known in the art to be suitable for an alkali metal ion battery), for example, carbon, silicon, magnesium, tin, aluminum and/or alloys thereof.

According to some embodiments, the anode comprises a composition-of-matter according to any of the embodiments described herein wherein the substance reversibly releasing an alkali metal is a compound which forms an alloy with the alkali metal and/or an alloy comprising the alkali metal. The anode may optionally form a part of an electrochemical half cell according to any of the respective embodiments described herein.

According to another aspect of embodiments of the invention, there is provided a rechargeable alkali metal ion battery comprising at least one electrochemical half cell comprising an anode which comprises a compound which forms an alloy with the alkali metal and/or an alloy comprising the alkali metal, the battery further comprising an alkali metal ion cathode (e.g., any cathode known in the art to be suitable for an alkali metal ion battery). The battery may comprise any number of electrochemical cells, of which some or all comprise at least one electrochemical half cell according to any of the respective embodiments described herein.

According to some embodiments, the alkali metal is lithium and the cathode comprises a lithium-containing substance (e.g., such as known in the art to be suitable for an alkali metal ion battery), for example, lithium iron phosphate, lithium cobalt oxide, lithium nickel oxide, lithium manganese oxide, lithium nickel manganese cobalt oxide, lithium nickel cobalt aluminum oxide and/or lithium titanate.

According to some embodiments of any of the embodiments relating to any one of the batteries described herein, when a battery and the cathode of the battery is in a fully charged state (e.g., the cathode contains none of its alkali metal cations), an amount of the alkali metal in an anode of the battery is at least 50% of a capacity of the anode (e.g., the anode capacity being the difference between an amount of alkali metal upon maximal absorption of the alkali metal by an anode composition-of-matter (a fully charged state of the anode), e.g., an anode composition-of-matter as described herein, and the amount of alkali metal (optionally zero) in the fully discharged state of the anode. In some embodiments, an amount of the alkali metal in an anode of the battery is at least 60% of a capacity of the anode. In some embodiments, an amount of the alkali metal in an anode of the battery is at least 70% of a capacity of the anode. In some embodiments, an amount of the alkali metal in an anode of the battery is at least 80% of a capacity of the anode. In some embodiments, an amount of the alkali metal in an anode of the battery is at least 90% of a capacity of the anode. In some embodiments, an amount of the alkali metal in an anode of the battery is at least 95% of a capacity of the anode. In some embodiments, an amount of the alkali metal in an anode of the battery is at least 98% of a capacity of the anode. In some embodiments, an amount of the alkali metal in an anode of the battery is at least 99% of a capacity of the anode.

Herein, the phrase "fully charged state" refers to a state of a battery and/or electrodes of a battery, wherein an anode is characterized by maximal absorption of the alkali metal (as described herein) and a cathode is characterized by a minimal amount of the alkali metal cations (as described herein) for a given set of conditions, e.g., a second form of a substance (as described herein), wherein the conditions are such as those within the battery during normal operation of the battery.

Herein, the phrase "fully discharged state" refers to a state of a battery and/or electrodes of a battery, wherein an anode is characterized by minimal amount of the alkali metal cations (as described herein) for a given set of conditions, e.g., a second form of a substance (as described herein), and a cathode is characterized by maximal absorption of the alkali metal cations (as described herein) for a given set of conditions, wherein the conditions are such as those within the battery during normal operation of the battery.

Herein, conditions of "normal operation of the battery" optionally comprise a temperature of 25° C., and a closed circuit allowing current to flow from the battery anode to the battery cathode, for example, at a discharge rate of 1 ampere.

According to some embodiments, in any one of the batteries described herein, when a battery and the cathode of the battery is in a fully discharged state, an amount of the alkali metal in an anode of the battery is no more than 50% of a capacity of the anode (e.g., the capacity being the difference between an amount of alkali metal upon maximal absorption of the alkali metal by an anode composition-of-matter, e.g., an anode composition-of-matter as described herein, and the amount of alkali metal (optionally zero) in the fully discharged state of the anode). In some embodiments, an amount of the alkali metal in an anode of the battery is no more than 40% of a capacity of the anode. In some embodiments, an amount of the alkali metal in an anode of the battery is no more than 30% of a capacity of the anode. In some embodiments, an amount of the alkali metal in an anode of the battery is no more than 20% of a capacity of the anode. In some embodiments, an amount of the alkali metal in an anode of the battery is no more than 10% of a capacity of the anode. In some embodiments, an amount of the alkali metal in an anode of the battery is no more than 5% of a capacity of the anode. In some embodiments, an amount of the alkali metal in an anode of the battery is no more than 2% of a capacity of the anode. In some embodiments, an amount of the alkali metal in an anode of the battery is no more than 1% of a capacity of the anode.

According to some embodiments of any one of the embodiments described herein, the capacity of the anode is about 100% of the capacity of the cathode, such that all or nearly all of the alkali metal released from the anode (e.g., during discharge of the battery) can be absorbed by the cathode, and all or nearly all of the alkali metal released from the cathode (e.g., during recharging of the battery) can be absorbed by the anode.

Preparation:

According to another aspect of embodiments of the invention, there is provided a process for preparing a composition-of-matter (e.g., according to any of the respective embodiments described herein) comprising a plurality of particles, the particles comprising a substance reversibly releasing an alkali metal (as defined herein), wherein in at least a portion of the particles, each particle is being encapsulated within a volume enclosed by a shell or matrix which conducts cations of the alkali metal, the process comprising:

i) providing particles comprising the substance reversibly releasing an alkali metal, wherein the substance is saturated with the alkali metal (e.g., in accordance with any one of the respective embodiments described herein, and any combination thereof); and ii) coating the particles with a conductor of cations of the alkali metal, the conductor of cations optionally being further capable of conducting, or is conducting, electrons (e.g., an electron-ion conductor, in accordance with any one of the respective embodiments described herein, and any combination thereof), thereby forming the shell or matrix.

A conductor of cations of the alkali metal, which is further capable of conducting, or which conducts, electrons, may optionally comprise at least one compound capable of conducting both the cations and electrons (a compound which is an electron-ion conductor). Alternatively or additionally, the conductor is a substance which comprises a combination of at least one compound which is an ion conductor capable of conducting, or which conducts, the cations with at least one compound which is an electron conductor.

Herein, the phrase "saturated with the alkali metal" refers to a substance having at least an amount of alkali metal as is present in the substance upon maximal absorption of the alkali metal, as described herein.

In some embodiments wherein the substance comprises a sulfide and/or polysulfide, a substance saturated with the alkali metal comprises alkali metal and sulfur at a ratio of $M_2S_n$, wherein n is in a range of from about 1 to 2, optionally from 1 to 1.99. Thus, when n is about 2 or less, the substance is saturated with the alkali metal with respect to a state wherein maximal absorption of the alkali metal forms the disulfide of the alkali metal ($M_2S_2$), whereas when n is about 1, the substance is saturated with the alkali metal with respect to a state wherein maximal absorption of the alkali metal forms the sulfide of the alkali metal ($M_2S$).

According to some embodiments of any one of the embodiments described herein, the coating comprises:

mixing the particles comprising the substance reversibly releasing an alkali metal with particles of a conductor of cations of the alkali metal (i.e., particles comprising an ion conductor described herein) and optionally further capable of conducting electrons, and optionally with additional particles of an electron conductor (i.e., particles comprising an electron conductor described herein, which are in addition to the aforementioned particles of a conductor of cations) to obtain a mixture; and subjecting the mixture to a heat treatment, to thereby form the shell or matrix.

According to some embodiments of the invention, the heat treatment effects sintering of particles in the mixture. In some embodiments, the heat treatment effects sintering of particles of a conductor of cations of the alkali metal (e.g., according to any of the respective embodiments described herein) and/or particles of an electron conductor (e.g., according to any of the respective embodiments described herein) with each other. Additionally or alternatively, in some embodiments, the heat treatment effects sintering of particles of a conductor of cations of the alkali metal (e.g., according to any of the respective embodiments described herein) and/or particles of an electron conductor (e.g., according to any of the respective embodiments described herein) with particles comprising the substance releasing an alkali metal (e.g., according to any of the respective embodiments described herein).

According to some embodiments of the invention, the sintering is effected by heating for at least 1 hour. In some embodiments, the sintering is effected by heating for 1 to 50 hours. In some embodiments, the sintering is effected by heating for 2 to 10 hours.

According to some embodiments of the invention, the sintering is effected at a temperature of no more than (i.e., not higher than a temperature that is) 10° C. lower than a melting point of the conductor of cations of the alkali metal. In some embodiments, the temperature is no more than (i.e., not higher than a temperature that is) 50° C. lower than the melting point. In some embodiments, the temperature is no more than (i.e., not higher than a temperature that is) 100° C. lower than the melting point. In some embodiments, the temperature is no more than (i.e., not higher than a temperature that is) 300° C. lower than the melting point.

According to some embodiments of the invention, the sintering is effected at a temperature in a range of from 100 to 400° C., optionally for at least one hour (e.g., from 1 to 50 hours), optionally for 2 to 10 hours.

According to some embodiments of the invention, the heat treatment effects melting of the particles of a conductor of cations of the alkali metal and/or particles of an electron conductor, but not melting of the particles comprising the substance reversibly releasing an alkali metal.

According to some embodiments of the invention, the heat treatment comprises heating to a temperature above a melting point of at least one ion conductor and/or electron conductor in the conductor of cations of the alkali metal and below a melting point of the substance reversibly releasing an alkali metal.

According to some embodiments of the invention, the shell or matrix is formed (e.g., by heat treatment according to any of the respective embodiments described herein) from particles characterized by a width in a range of from 0.5 to 100 nm, optionally from 0.5 to 25 nm, and optionally from 1 to 20 nm, according to any of the respective embodiments described herein. In some embodiments, the process comprises grinding the ingredients of the shell or matrix to form particles of such a size.

According to some embodiments of the invention, the process comprises forming particles according to any of the respective embodiments described herein (e.g., particles comprising the substance reversibly releasing an alkali metal and/or particles for forming the shell or matrix) by ball-milling.

According to some embodiments of the invention, the process further comprise grinding the composition-of-matter (e.g., after a heat treatment according to any of the respective embodiments described herein) to form a powder (e.g., a powder according to any of the respective embodiments described herein), optionally by ball-milling.

According to some embodiments of any one of the embodiments described herein, the composition-of-matter (e.g., in the form of a powder, as described herein) is attached to a current collector to form an electrode, optionally using a suitable binder (e.g., a binder used in the art for forming electrodes) and optionally together with carbon powder.

According to some embodiments of the invention, the composition-of-matter is subjected to conditions which cause release ("discharge") of at least a portion of the alkali metal therein (e.g., such that the substance reversibly releasing the alkali metal is no longer saturated with the alkali metal). In some embodiments, this step is performed after attaching the composition-of-matter to a current collector, e.g., to form an electrode as described herein. Optionally, the conditions comprise an electric potential and contact with a liquid (e.g., a liquid comprising an electrolyte, as described herein) which induces release of alkali metal ions into the liquid, for example, upon oxidation of a substance (e.g., sulfide and/or polysulfide) to which alkali metal ions are absorbed and/or upon oxidation of alkali metal atoms, at the anode to form alkali metal ions released into the electrolyte.

The amount of alkali metal to be released is optionally controlled (e.g., by controlling the conditions which cause release and/or the time during which the composition-of-matter is subjected to such conditions) so as to obtain an electrode with an alkali metal content compatible with the alkali metal content of another electrode, optionally for assembling an electrochemical cell (e.g., in a rechargeable battery such as described herein) from the electrodes. For example, when one electrode is in a state of maximal absorption of the alkali metal, the other electrode is preferably substantially free of the alkali metal (e.g., as described herein); and when one electrode is partially (e.g., about 50%) discharged, the other electrode is preferably partially (e.g., about 50%) discharged.

According to another aspect of embodiments of the invention, there is provided a composition-of-matter prepared by a process according to any of the embodiments described herein relating to a process.

It is expected that during the life of a patent maturing from this application many relevant battery components and designs will be developed and the scope of the terms "anode", "cathode", "electrolyte", "battery", "electrochemical half cell" and the like are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Preparation of Exemplary Cathodes Comprising Encapsulated Lithium Sulfide

Mixed electron-ion conductor materials for a shell or cage matrix (referred to herein as "matrix material") and an electrochemically active core material comprising $Li_2S$ were ground together by ball-milling for 30 minutes to 4 hours at 450 rotations per minute. In some samples, the matrix material and/or the core material was also ground previously by ball-milling for 4 to 24 hours at 450 rotations per minute. The matrix material and the core material were mixed at a weight ratio in a range of from 61:39 to 85:15 core material to matrix material.

Mixed electron-ion conductor materials included ion (lithium) conductors (such as $Li_2CO_3$, $Li_2SO_4$ and LiF), electron conductors (such as Ni nanoparticles or graphite) and dopants (such as $CaF_2$). $Al_2O_3$ was also included in some matrix materials, for enhancing mechanical strength and/or cation conduction. The core material consisted of $Li_2S$ alone or mixed with graphite or Ni nanoparticles (electron conductors).

The samples were then heated for at least 2 hours at a temperature in a range of from 330 to 780° C. under an inert atmosphere, to sinter the materials and/or melt the matrix material without melting the $Li_2S$ in the core material, thereby forming a mixed conductor matrix encapsulating a $Li_2S$-containing core. Table 1 described the composition and preparation of exemplary mixed conductor matrices and encapsulated $Li_2S$-containing cores. The baked sample was ground to obtain a powder.

The obtained powder was then used to fabricate cathodes for electrochemical measurements. All assembly steps were performed in an argon-filled glove box.

Commercial EC:DEC (ethylene carbonate:diethylcarbonate) electrolyte solutions were also tested, but gave worse results.

Coin cells were fabricated with a porous polypropylene separator (Celgard® 2400), and a lithium metal foil was

TABLE 1 composition and preparation of exemplary mixed conductor matrices with $Li_2S$-containing cores.

| | | | Mix A | Mix B | Mix C | Mix D | Mix E | Mix F |
|---|---|---|---|---|---|---|---|---|
| Core material ingredients (weight %) | $Li_2S$ | | 70 | 64 | 68 | 46 | 67 | 81 |
| | Graphite | | | | | 15 | | |
| | Ni | | | | | | | 4 |
| Matrix material ingredients (weight %) | $Li_2CO_3$ | | 29 | | | | | |
| | $Li_2SO_4$ | | | 25 | 23 | | 30 | |
| | LiF | | | 9 | 8 | 32 | | 14 |
| | Graphite | | | | | 5 | | |
| | Ni | | 1 | 2 | 1 | | 3 | 1 |
| | $CaF_2$ | | | | | 1 | | |
| | $Al_2O_3$ | | | | | 1 | 0.3 | |
| Ball-milling | Dry/wet | | Dry | Wet | Wet | Wet | Wet | Wet |
| | Time [hours] | Core material alone | 0 | 0 | 0 | 4 | 4 | 12 |
| | | Matrix material alone | 0 | 8 | 24 | 24 | 16 | 24 |
| | | Core material and matrix material together | 4 | 4 | 1 | 1 | 0.5 | 2 |
| Baking | | | 780° C. (2 hours) | 650° C. (2 hours) | 200° C. (2 hours) + 330° C. (2.75 hours) | 350° C. (2 hours) | 350° C. (2 hours) | 780° C. (2 hours) |

Catalytic ink (in the form of a paste) was prepared with different binders, such as polyvinylidene difluoride (PVdF) and poly(styrene-co-butadiene) rubber (SBR), dissolved in cyclopentanone (for PVDF) or toluene (for SBR). A desired amount of the obtained powder (prepared as described hereinabove) was added to the dissolved binder solution and stirred overnight with the use of a magnetic stirrer. The weight percent of the binder was 5-20% of all solids. The weight ratio of all solids to solvent was about 1:6 to 1:12.

The catalytic ink was coated on a 15-50 µm thick aluminum foil, and was dried overnight (cyclopentanone-based ink) or for 2-5 hours (toluene-based ink) at room temperature. The electrodes were then dried at 80-130° C. for 1-5 hours in order to cure PVdF (in cyclopentanone-based ink) or at 40-60° C. for 2-6 hours in order to fully evaporate the solvent (in toluene-based ink). $Li_2S$ loading varied in the range of 0.1-5 mg/cm$^2$.

The cathodes were tested using several electrolytes:

(a) 10 weight percents lithium bis(trifluoromethanesulfonyl)imide (LiTFSI) and 1 to 10 weight percents lithium nitrate (LiNO$_3$) dissolved in 1,3-dioxolane (DOL) and 1,2-dimethoxyethane (DME) (at a 0.5:1 to 2:1 DOL:DME weight ratio);

(b) 10 weight percents LiTFSI in N-methyl-N-butylpyrrolidinium bis(trifluoromethane sulfonyl)imide (PYR14TFSI) and poly(ethylene glycol) dimethyl ether (PEGDME) (at a 0.5:1 to 2:1 PYR14TFSI:PEGDME weight ratio); and (c) mixtures of (a) and (b) in various ratios.

used as an anode. Electrochemical measurements were carried out using a Bio-Logic EC-Lab instrument, at constant current or at constant power.

As shown in FIG. 10, the capacity of an exemplary sulfur-containing cathode (prepared using Mix D as described in table 1) anode was largely maintained over the course of 30 charge-discharge cycles. As further shown therein, an average coulombic efficiency of 95% was maintained over the course of 30 cycles.

As shown in FIGS. 10 and 11, cathode was rechargeable and exhibited a very high coulombic efficiency, indicating minimal shuttle of polysulfides, as desired.

XPS (X-ray photoelectron spectroscopy) measurements (of samples prepared using Mix E as described in table 1) and electron microscopy (of samples prepared using Mix A as described in table 1) were performed in order to ascertain the structure of the sintered anode powder.

As shown in FIG. 12, XPS analysis showed a $Li_2SO_4$ signal which decreased gradually on sputtering, followed by a gradually increasing $Li_2S$ signal.

As shown in FIGS. 13, 14A and 14B, tunneling electron microscopy (TEM) showed an electron-dense (dark) core surrounded by a less electron-dense (light) shell (FIGS. 13 and 14B), indicating a lithium sulfide core enveloped by lithium carbonate, whereas no shell was observed when no matrix material was included (FIG. 14A).

As shown in FIG. 15, environmental scanning electron microscopy (ESEM) showed that the sub-micrometer structure of the matrix encapsulating $Li_2S$ particles (0.2 to 2 µm in size) was characterized by smooth edges and surfaces with no visible pores, indicating the melting of the shell materials.

These results indicate that lithium sulfide is encapsulated by a thin shell layer of the lithium salt of the matrix material, and that the lithium sulfide is protected from the effects of volumetric expansion during cycling.

Example 2

Exemplary General Procedures for Preparing Cathodes Comprising Encapsulated Lithium Sulfide Ball-milling of the ion and/or electron conductor materials for a shell or matrix (referred to herein as "matrix material") is performed. This may optionally be done separately for each material, in a single step, or in several steps, in order to reach the desired particle size for each material.

The electron conductors optionally comprises carbon nanoparticles, such as, without limitation, carbon black, graphite, carbon nanotubes, graphene and/or graphene oxide; and/or metal nanoparticles, such as, without limitation, nanoparticles of Ni, Sn, Co and/or Fe and mixtures thereof.

The ion (e.g., lithium cation) conductor materials optionally comprise lithium salts, such as, without limitation, $Li_2CO_3$, $Li_2SO_4$, LiF and/or mixtures thereof; lithiated ion conductive polymers such as, without limitation, sulfonated tetrafluoroethylene (e.g., Nafion®); metal sulfides and lithiated metal sulfides (preferably fully lithiated metal sulfides), such as, without limitation, $TiS_2$, CuS, $Cu_2S$, CoS, $FeS_2$, $LiTiS_2$, LiCuS, $LiCoS_2$, and/or $LiFeS_2$; fully lithiated metal oxides, such as, without limitation, oxides of Ti, Ni, Co, Mn, Fe and/or mixtures thereof (e.g., $Li_4Ti_5O_{12}$, $LiNi_{0.33}Co_{0.33}Mn_{0.33}O_2$, $LiFePO_4$). Some of these materials, such as $TiS_2$, CuS, $Cu_2S$, CoS, $FeS_2$, $LiTiS_2$, LiCuS, $LiCoS_2$, and $LiFeS_2$, oxides of Ti, Ni, Co, Mn and/or Fe (e.g., $Li_4Ti_5O_{12}$, $LiNi_{0.33}Co_{0.33}Mn_{0.33}O_2$, $LiFePO_4$) are both electron and ion conductors. When using sodium anode materials, sodium compounds are used instead of the corresponding lithium compounds, for example, $Na_2SO_4$ and NaF may be used (e.g., instead of $Li_2SO_4$ and LiF). The ball-milling may be wet or dry, optionally performed from 0.1 to 72 hours, and optionally at a frequency of from 100 to 1000 rotations per minute.

Ball-milling of the electrochemically active core materials is performed. The core materials include an alkali metal sulfide and/or disulfide, such as lithium sulfide, lithium disulfide ($Li_2S_2$), sodium sulfide and/or potassium sulfide. The ball-milling may be wet or dry, optionally performed from 2 to 72 hours, and optionally at a frequency of from 100 to 1000 rotations per minute. Various materials may optionally be added (optionally up to 50% in total) to the alloy for co-milling, for example, carbon material (optionally up to 50%), a catalyst (optionally up to 30%), an electron conductor and/or ion conductor described hereinabove (optionally up to a 30% in total) and/or a material described hereinabove which is both an electron conductor and an ion conductor (optionally up to 30%).

It is preferable that the final size of the matrix material particles is smaller than that of the alkali metal sulfide particles.

The alkali metal alloy (core) particles and matrix materials are then mixed by any suitable method, optionally by milling or homogenization, at a core to shell ratio in a range of from 100:1 to 1:1 (optionally, from 20:1 to 4:1). Optionally, mixing is by ball-milling (wet or dry), optionally performed from 0.5 to 4 hours, and optionally at a frequency of from 100 to 1000 rotations per minute.

Heat treatment is then optionally applied to the mixed powders in an inert environment, for sintering of all the materials or for melting the matrix materials without melting the alkali metal sulfide, thereby achieving a non-porous homogeneous shell or matrix. Heat treatment is optionally applied at a temperature of 100-800° C., optionally for up to a few hours, depending on the matrix material composition and desired outcome.

In some cases the samples are not sintered (e.g., when the ball-milling binds all of the materials together).

After cooling to room temperature, the heat-treated sample is optionally ground to reclaim a powder form with particles having an average size between 0.1 to 20 microns, preferably from 0.3 to 5 microns.

The sample is optionally then treated with dissolved sulfur solution, to extract uncoated alkali metal sulfide and/or disulfide by forming dissolved polysulfide compounds. The color of the filtrate will indicate the amount of uncoated sulfide and/or disulfide. The sample is than filtered, washed of excess sulfur derivatives and vacuum dried.

The obtained powder may then be used to fabricate cathodes for electrochemical measurements, optionally in an argon-filled glove box.

Catalytic ink (e.g., paste) is prepared with different binders, such as poly(vinylidene difluoride) (PVdF) or poly(styrene-co-butadiene) rubber (SBR), dissolved in cyclopentanone (for PVDF) or toluene (for SBR). Other binders such as, without limitation, poly(acrylic acid), polyethylene oxide, alginic acid, alginates, poly(vinyl alcohol) and/or carboxymethylcellulose may be used. A desired amount of the powder comprising the alkali metal sulfide (and/or disulfide) is added to the dissolved binder solution. The weight percent of the binder is optionally 5-20% of all solids. The weight ratio of all solids to solvent is optionally about 1:6 to 1:12. The catalytic ink may then be coated on a cathode material (e.g., aluminum) and dried to evaporate the solvent from the coating.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A process for preparing a composition-of-matter comprising a plurality of particles, said particles comprising $Li_2S$, wherein in at least a portion of said particles, each particle is being encapsulated within a volume enclosed by a shell or matrix which conducts lithium cations, the process comprising:
   i) providing particles comprising said $Li_2S$; and
   ii) coating said particles with a conductor of lithium cations, thereby forming said shell or matrix, wherein said conductor of lithium cations is selected from the group consisting of lithium carbonate, lithium sulfate, a metal disulfide comprising lithium, and any combination thereof, wherein said coating comprises:

mixing said particles comprising said $Li_2S$ with particles of said conductor of lithium cations, and optionally with additional particles of an electron conductor, to obtain a mixture; and subjecting said mixture to a heat treatment, to thereby form said shell or matrix.

2. The process of claim 1, wherein said heat treatment effects sintering of particles in said mixture.

3. The process of claim 1, wherein said heat treatment effects melting of said particles of said conductor of lithium cations and/or said additional particles of an electron conductor, but not melting of said particles comprising said $Li_2S$.

4. The process of claim 1, wherein said shell or matrix is formed from particles characterized by a width in a range of from 0.5 to 100 nm.

5. The process of claim 1, further comprising grinding said composition-of-matter to form a powder.

6. The process of claim 1, wherein said conductor of lithium cations is selected from the group consisting of lithium carbonate, lithium sulfate, and any combination thereof.

7. A process for preparing a composition-of-matter comprising a plurality of particles, said particles comprising $Li_2S$, wherein in at least a portion of said particles, each particle is being encapsulated within a volume enclosed by a shell or matrix which conducts lithium cations, the process comprising:

i) providing particles comprising said $Li_2S$; and ii) coating said particles with a conductor of lithium cations, thereby forming said shell or matrix, wherein said conductor of lithium cations is selected from the group consisting of lithium carbonate, lithium sulfate, a metal disulfide comprising lithium, and any combination thereof, said coating comprising:

mixing said particles comprising said $Li_2S$ with particles of said conductor of lithium cations, and optionally with additional particles of an electron conductor, to obtain a mixture; and subjecting said mixture to a heat treatment which effects sintering of particles in said mixture and to a heat treatment which effects melting of said particles of said conductor of lithium cations and/or said additional particles of an electron conductor, but not melting of said particles comprising said $Li_2S$, to thereby form said shell or matrix.

8. The process of claim 7, wherein said shell or matrix is formed from particles characterized by a width in a range of from 0.5 to 100 nm.

9. The process of claim 7, wherein said conductor of lithium cations is selected from the group consisting of lithium carbonate, lithium sulfate, and any combination thereof.

* * * * *

UNITED STATES PATENT AND TRADEMARK OFFICE
CERTIFICATE OF CORRECTION

PATENT NO. : 11,050,051 B2
APPLICATION NO. : 15/115935
DATED : June 29, 2021
INVENTOR(S) : Peled et al.

Page 1 of 1

It is certified that error appears in the above-identified patent and that said Letters Patent is hereby corrected as shown below:

On the Title Page

In the section titled Related U.S. Application Data, delete the following:
"(63) Continuation of application No. PCT/IL2015/050119, filed on Feb. 3, 2015."

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*